United States Patent
Dille et al.

(10) Patent No.: US 11,193,349 B1
(45) Date of Patent: Dec. 7, 2021

(54) DUAL PATH CONTROL FITTING

(71) Applicant: KHOLLE Magnolia 2015, LLC, Houston, TX (US)

(72) Inventors: Mark C. Dille, Magnolia, TX (US); Larry Mitchell Hill, Cypress, TX (US); William Brent Stroebel, Houston, TX (US); Scott Taylor Donaldson, Spring, TX (US); E. Lee Colley, III, Jersey Village, TX (US)

(73) Assignee: KHOLLE Magnolia 2015, LLC, Tomball, TX (US)

( * ) Notice: Subject to any disclaimer, the term of this patent is extended or adjusted under 35 U.S.C. 154(b) by 0 days.

(21) Appl. No.: 16/892,777

(22) Filed: Jun. 4, 2020

Related U.S. Application Data

(60) Provisional application No. 62/992,931, filed on Mar. 21, 2020.

(51) Int. Cl.
*E21B 34/02* (2006.01)
*E21B 43/26* (2006.01)
*E21B 33/072* (2006.01)
*F16K 11/07* (2006.01)

(52) U.S. Cl.
CPC ............ *E21B 34/02* (2013.01); *E21B 33/072* (2013.01); *E21B 43/2607* (2020.05); *F16K 11/0716* (2013.01)

(58) Field of Classification Search
CPC ........ E21B 34/02; E21B 34/025; E21B 43/26; E21B 33/072; E21B 43/2607; F16K 11/0716
See application file for complete search history.

(56) References Cited

U.S. PATENT DOCUMENTS

| | | |
|---|---|---|
| 8,839,867 B2 | 9/2014 | Conrad |
| 8,978,763 B2 | 3/2015 | Guidry |
| 9,068,450 B2 | 6/2015 | Guidry |
| 9,222,345 B2 | 12/2015 | Conrad |
| 9,255,469 B2 | 2/2016 | Conrad |
| 9,518,430 B2 | 12/2016 | Guidry |
| 9,631,469 B2 | 4/2017 | Guidry et al. |
| 9,903,190 B2 | 2/2018 | Conrad et al. |

(Continued)

OTHER PUBLICATIONS

Cameron, *Frac Manifold Systems—Increase Operational Efficiencies of Simultaneous Completion Operations* (© 2016 Schlumberger).

(Continued)

*Primary Examiner* — James G Sayre
(74) *Attorney, Agent, or Firm* — Keith B. Willhelm

(57) ABSTRACT

Dual path control fittings have a fitting body and a cylindrical plunger. The fitting body has a cylindrical bore, a first conduit, and a second conduit. The cylindrical bore provides a first inlet and an opening. The first conduit provides a second inlet. The second conduit provides an outlet. The cylindrical plunger is mounted for reciprocation in the bore and has a first conduit and a second conduit. The first conduit extends from one end of the plunger to a port on the circumference of the plunger. The second conduit extends transversely across the plunger. The plunger has a first position in which the port is aligned with the second fitting body conduit to provide a first path and a second position in which the plunger second conduit is aligned with the fitting body first and second conduits to provide a second path.

50 Claims, 21 Drawing Sheets

(56) References Cited

U.S. PATENT DOCUMENTS

| | | |
|---|---|---|
| 9,915,132 B2 | 3/2018 | Conrad |
| 9,932,800 B2 | 4/2018 | Guidry |
| 10,094,195 B2 | 10/2018 | Guidry |
| 10,132,146 B2 | 11/2018 | Guidry |
| 10,323,475 B2 | 6/2019 | Christopherson et al. |
| 10,385,643 B2 | 8/2019 | Guidry |
| 10,385,645 B2 | 8/2019 | Guidry |
| 10,385,662 B2 | 8/2019 | Conrad |
| 10,487,637 B2 | 11/2019 | Guidry et al. |
| 2017/0204714 A1* | 7/2017 | Roesner .................. E21B 43/26 |
| 2018/0291718 A1 | 10/2018 | Conrad et al. |
| 2019/0257186 A1* | 8/2019 | Saleh ...................... E21B 43/26 |

OTHER PUBLICATIONS

Cameron, *Monoline Flanged-Connection Fracturing Fluid Delivery Technology* (© 2016 Schlumberger).
GE Oil & Gas, *Gate Valves—Pressure Control Sandbuster® Slab Gate Valve* (© GE 2013).
GE Oil & Gas, *Shale 360™ Services Vertical Frac Manifold* (© GE 2015).
MMA, *Model T5 API 6A Gate Valve 5 KSI MWP* (Jun. 2015).
Oil States Energy Services, *Frac Stacks* (© 2013 Oil States Energy Services).

\* cited by examiner

DUAL PATH CONTROL FITTING

FIELD OF THE INVENTION

The present invention relates generally to fluid transportation systems and flow lines and components used in those systems, and especially fittings to control flow and allow tool operations in systems that convey abrasive, corrosive fluids under high pressure such as systems for fracturing oil and gas wells.

BACKGROUND OF THE INVENTION

Hydrocarbons, such as oil and gas, may be recovered from various types of subsurface geological formations. The formations typically consist of a porous layer, such as limestone and sands, overlaid by a nonporous layer. Hydrocarbons cannot rise through the nonporous layer. Thus, the porous layer forms a reservoir, that is, a volume in which hydrocarbons accumulate. A well is drilled through the earth until the hydrocarbon bearing formation is reached. Hydrocarbons then can flow from the porous formation into the well. In what is perhaps the most basic form of rotary drilling methods, a drill bit is attached to a series of pipe sections or "joints" referred to as a drill string. The drill string is suspended from a derrick and rotated by a motor in the derrick. A drilling fluid or "mud" is pumped down the drill string, through the bit, and into the bore of the well. This fluid serves to lubricate the bit. The drilling mud also carries cuttings from the drilling process back to the surface as it travels up the wellbore. As the drilling progresses downward, the drill string is extended by adding more joints of pipe.

When the drill bit has reached the desired depth, larger diameter pipes, or casing, are placed in the well and cemented in place to prevent the sides of the borehole from caving in. The well may be extended by drilling additional sections and installing large, but somewhat smaller pipes, or liners. The liners also are typically cemented in the bore. The liner may include valves, or it may then be perforated. In either event, openings in the liner are created through which oil can enter the cased well. Production tubing, valves, and other equipment are installed in the well so that the hydrocarbons may flow in a controlled manner from the formation, into the lined well bore, and through the production tubing up to the surface for storage or transport.

Hydrocarbons, however, are not always able to flow easily from a formation to a well. Some subsurface formations, such as sandstone, are very porous. Hydrocarbons can flow easily from the formation into a well. Other formations, however, such as shale rock, limestone, and coal beds, are only minimally porous. The formation may contain large quantities of hydrocarbons, but production through a conventional well may not be commercially practical because hydrocarbons flow though the formation and collect in the well at very low rates. The industry, therefore, relies on various techniques for improving the well and stimulating production from formations. In particular, various techniques are available for increasing production from formations which are relatively nonporous.

Perhaps the most important stimulation technique is the combination of horizontal wellbores and hydraulic fracturing. A well will be drilled vertically until it approaches a formation. It then will be diverted, and drilled in a more or less horizontal direction, so that the borehole extends along the formation instead of passing through it. More of the formation is exposed to the borehole, and the average distance hydrocarbons must flow to reach the well is decreased. Fractures then are created in the formation which will allow hydrocarbons to flow more easily from the formation.

Fracturing a formation is accomplished by pumping fluid, most commonly water, into the well at high pressure and flow rates. Proppants, such as grains of sand, ceramic or other particulates, usually are added to the fluid along with gelling agents to create a slurry. The slurry is forced into the formation at rates faster than can be accepted by the existing pores, fractures, faults, vugs, caverns, or other spaces within the formation. Pressure builds rapidly to the point where the formation fails and begins to fracture. Continued pumping of fluid into the formation will tend to cause the initial fractures to widen and extend further away from the wellbore, creating flow paths to the well. The proppant serves to prevent fractures from closing when pumping is stopped.

A formation rarely will be fractured all at once. It typically will be fractured in many different locations or zones and in many different stages. Fluids will be pumped into the well to fracture the formation in a first zone. Typically, the first zone will be at the bottom or "toe" of the well. After the initial zone is fractured, pumping is stopped, and a plug is installed or otherwise established in the liner at a point above the fractured zone. Pumping is resumed, and fluids are pumped into the well to fracture the formation in a second zone located above the plug. That process is repeated for zones further up the formation until the formation has been completely fractured.

Once the well is fractured, large quantities of water and sand that were injected into the formation eventually must be allowed to flow out of the well. The water and sand will be separated from hydrocarbons produced by the well to protect downstream equipment from damage and corrosion. The production stream also may require additional processing to neutralize corrosive agents in the stream.

Fracturing typically involves installing a production liner in the portion of the wellbore passing through the hydrocarbon bearing formation. The production liner may incorporate valves, typically sliding sleeve "ball-drop" valves, to divert fluid into the formation. More commonly, however, the production liner does not incorporate valves. Instead, fracturing will be accomplished by "plugging and perfing" the liner. In a "plug and perf" job, the production liner is made up from standard joints of liner. The liner does not have any openings through its sidewalls, nor does it incorporate frac valves. It is installed in the wellbore, and holes then are punched in the liner walls. The perforations typically are created by so-called "perf" guns which discharge shaped charges through the liner and, if present, adjacent cement.

A conventional "plug and perf" job is illustrated schematically in FIG. 1. As shown in FIG. 1A, the upper portion of a well 1 is provided with a casing 3, while the lower portion is an open bore 4 extending generally horizontally through a hydrocarbon bearing formation 5.

A liner assembly 10 has been suspended from casing 3 by a liner hanger 11. Liner assembly 10 extends through open bore 4 and includes various tools, such as a "toe" or "initiator" valve 12 and a float assembly 13. Float assembly 13 typically includes various tools that assist in running liner 10 into well 1 and cementing it in bore 4, such as a landing collar 14, a float collar 15, and a float shoe 16.

Liner 10 has been cemented in bore 4 and the initial stage of a frac job has been completed. That is, cement 6 completely fills the annulus between liner 10 and bore 4. Toe valve 12, having been run in on liner 10 in its shut position, has been opened. Fluid has been pumped through a wellhead assembly 8, down liner 10, and into formation 5 via open toe valve 12. The fluid has created fractures 9 extending from toe valve 12 in a first zone near the bottom of well 1.

A typical frac job will proceed in stages from the lowermost zone in a well to the uppermost zone. Thus, FIG. 1A shows a "plug and perf" tool string 20 that has been run through wellhead assembly 8 and into liner 10 on a wireline 24. Tool string 20 comprises a perf gun 21, a setting tool 22, and a frac plug 23*a*. Tool string 20 is positioned in liner 10 such that frac plug 23*a* is uphole from toe valve 12. Frac plug 23*a* is coupled to setting tool 22 and will be installed in liner 10 by actuating setting tool 22 via wireline 24. Once plug 23*a* has been installed, setting tool 22 will be released from plug 23*a*. Perf gun 21 then will be fired to create perforations 17*a* in liner 10 uphole from plug 23*a*. Perf gun 21 and setting tool 22 then will be pulled out of well 1 by wireline 24.

A frac ball (not shown) then will be deployed onto plug 23*a* to restrict the downward flow of fluids through plug 23*a*. Plug 23*a*, therefore, will substantially isolate the lower portion of well 1 and the first fractures 9 extending from toe valve 12. Fluid then can be pumped into liner 10 and forced out through perforations 17*a* to create fractures 9 (shown in FIG. 1B) in a second zone. After fractures 9 have been sufficiently developed, pumping is stopped and valves in wellhead assembly 8 will be closed to shut in the well 1. After a period of time, fluid will be allowed to flow out of fractures 9, through liner 10 and casing 3, to the surface.

Additional plugs 23*b* to 23*z* then will be run into well 1 and set, liner 10 will be perforated at perforations 17*b* to 17*z*, and well 1 will be fractured in succession as described above until, as shown in FIG. 1B, all stages of the frac job have been completed and fractures 9 have been established in all zones. Once the fracturing operation has been completed, plugs 23 typically will be drilled out and removed from liner 10. Production equipment then will be installed in the well and at the surface to control production from well 1.

Frac jobs also have become more extensive, both in terms of the pressures required to fracture a formation and the time required to complete all stages of an operation. Prior to horizontal drilling, a typical vertical well might require fracturing in only one, two or three zones at pressures usually well below 10,000 psi. The longest horizontal extensions of a well bore now are almost three and a half miles long. Fracturing a horizontal well, therefore, may require fracturing in 20 or more zones. Horizontal wells in shale formations such as the Eagle Ford shale in South Texas typically require fracturing pressures of at least 9,000 psi and 6 to 8 hours or more of pumping. Horizontal wells in the Haynesville shale in northeast Texas and northwest Louisiana require pressures around 13,500 psi. Pumping may continue near continuously—at flow rates of 2 to 3 thousand gallons per minute (gpm)—for several days before fracturing is complete. All that places increasing performance demands on flowline components used to fracture a well.

Thus, the surface systems for successfully completing a fracturing operation are extensive and complex, as may be appreciated from FIG. 2. FIG. 2 illustrates schematically a conventional frac system. Water from tanks 101 and gelling agents dispensed by a chemical unit 102 are mixed in a hydration unit 103. The discharge from hydration unit 103, along with sand carried on conveyors 104 from sand tanks 105 is fed into a blending unit 106. Blender 106 mixes the gelled water and sand into a slurry. The slurry is discharged through low-pressure hoses 107 which convey it into two or more low-pressure lines 108 in a frac manifold 109. The low-pressure lines 108 in frac manifold 109 feed the slurry to an array of pumps 110, perhaps as many as a dozen or more, through low-pressure "suction" hoses 111.

Pumps 110 take the slurry and discharge it at high pressure through individual high-pressure "discharge" lines 112 into a "missile" 113 on frac manifold 109. The combined flow from pump discharge lines 112 flows through missile 113 into a high-pressure line 114 running to a junction head 115 of a "zipper" manifold 116 (also referred to by some as a "frac manifold"). Zipper manifold 116 includes flow lines 117 running to, for example, two wellhead assemblies 8 that control flow into and out of the well. Valves 118 are provided in zipper flow lines 117 so that the frac slurry may be selectively diverted to one of wellhead assemblies 8. Once fracturing is complete, flow back from the fracturing operation discharges into a flowback manifold 120 which leads into flowback tanks 121. Valves 118 then will be operated to divert frac fluid into the other wellhead assembly 8 to frac that well.

Frac systems are viewed as having "low-pressure" and "high-pressure" sides or, more simply, as having low sides and high sides. The low side is the portion of the system that is upstream of the inlet of pumps 110, e.g., water tanks 101, hydration unit 103, blending unit 106, and the low-pressure lines 108 of frac manifold 109, which operate under relatively low pressures. The conduits on the low-pressure side typically will be flexible hoses, such as blender hoses 107 and suction hoses 111.

The high side is the part of the system that is downstream of the discharge outlets of pumps 110, e.g., the high-pressure missile 113 of frac manifold 109 and flow line 114 running to junction head 115, which operate under relatively high pressures. The high side of the system in assembled from components generally referred to as "frac iron," "flow iron," or "ground iron." They include sections of straight steel pipe, such as pup joints. They also include various fittings, such as tees, crosses, laterals, and wyes, which provide junctions at which flow is split or combined. In addition to junction fittings, flowline components include fittings which are used to alter the course of a flow line. Such directional fittings include elbows and swivel joints. High-pressure flow lines also incorporate gauges and other monitoring equipment, as well as control fittings such as shut-off, plug, check, throttle, pressure release, butterfly, and choke valves.

High side components must be extremely rugged. They are required to endure extremely abrasive frac slurries flowing at extremely high pressures and rates. Not only is the slurry abrasive, but it often is corrosive as well. It can rapidly erode and weaken conduit walls. That can be a particular problem for shut off valves that are commonly used in frac systems and in the wellhead assembly.

Wellhead assembly 8, for example, is assembled from a number of different frac iron components. Those components vary depending on the operations being conducted on the well, but typically include tees, crosses, or other junction fittings and shut-off valves. Given the variety of operations that are conducted through wellhead assembly 8, many shut-off valves may be required, especially if redundancy of valves is desired. Zipper manifold 116 also incorporates shut-off valves 118 that may be opened and shut to selectively divert fluid to wellhead assemblies 8. As the number of valves increase, so does the cost of the system, as does the complexity of its installation and operation.

The shut-off valves used in zipper manifolds and wellhead assemblies are almost always gate valves or, as they are sometimes called, sluice valves. While there are several variations on the basic design, all gate valves incorporate a gate that can be raised and lowered. The gate typically is a disc or rectangular shaped plate. When lowered, the gate extends completely across the passage and engages seats extending around the periphery of the passage. When raised, the gate retracts above the valve passage. Gate valves can effectively shut off flow through a flow line. Though poorly suited to regulating flow, when fully open, gate valves minimally restrict flow. Pressure drop through the valve is effectively minimized. Their relatively large orifice also allows tool operations to be conducted through the valve. Finally, gate valves tend to be less expensive that other types of conventional shut-off valves, such as ball valves.

Gate valves, however, have various attendant problems. Because they tend to stay in either their open or shut positions for extended periods of time, the gate can seize, especially in the shut position. The valves must be greased regularly to minimize such problems and to allow the gate to move easily and seat effectively. Grease used to lubricate gate valves, however, can be blown into the well where it can interfere with the operation of downhole tools. For example, grease pushed into a liner can cause plugs to lose their grip on liner walls, allowing them to be displaced by flow in the liner.

, both the face of the gate and the seat must be relatively clean. Otherwise the gate may not seat properly and shut off flow completely. The seat, however, extends around the inner diameter of the passage. The gate must drop into a groove in order to seal against the seat. That groove can easily become loaded with sand and other proppants suspended in frac fluids. It must be flushed and cleaned regularly to avoid leakage through the valve.

The statements in this section are intended to provide background information related to the invention disclosed and claimed herein. Such information may or may not constitute prior art. It will be appreciated from the foregoing, however, that there remains a need for new and improved components for frac systems and other high-pressure fluid transportation systems and wellhead assemblies, especially to fittings for controlling flow and allowing access for tool operations. Likewise, there is a need for new and improved methods of controlling flow and conducting tool operations through such systems. Such disadvantages and others inherent in the prior art are addressed by various aspects and embodiments of the subject invention.

SUMMARY OF THE INVENTION

The subject invention, in its various aspects and embodiments, relates generally to flowline fittings. The novel fittings may be used, for example, to control flow into and out of a wellhead assembly or through other portions of a frac system. They also may be used to allow tool access into a wellhead assembly or another portion of a frac system. One broad embodiment provides dual path control fittings for a system for fracturing a well. The fittings comprise a fitting body and a cylindrical plunger. The fitting body has a cylindrical bore, a first conduit, and a second conduit. The cylindrical bore extends axially through the fitting body and provides a first inlet at one end thereof and an opening at the other end thereof. The first conduit extends radially through the fitting body into the bore and provides a second inlet. The second conduit extends radially through the fitting body into the bore and provides an outlet. The first and second fitting body conduits are aligned along a common axis. The cylindrical plunger is mounted for reciprocation in the bore and has a first conduit and a second conduit. The first conduit extends from one end of the plunger to a port on the circumference of the plunger. The second conduit extends transversely across the plunger. The plunger is adapted to reciprocate between a first position and a second position. In the first position the port is aligned with the second fitting body conduit to provide a first path through the fitting body from the first inlet to the fluid outlet. In the second position the plunger second conduit is aligned with the fitting body first and second conduits to provide a second path through the fitting body from the second inlet to the fluid outlet. The first path is shut when the plunger is in the second position and the second path is shut when the plunger is in the first position.

Other embodiments provide such dual path control fittings where the port is normal to the axis of the plunger, or where the plunger first conduit has a sweeping 90° curve leading to the port, or where the plunger second conduit is normal to the primary axis of the plunger, or where the second conduit is isolated from the first conduit, or where the first and second fitting body conduits are aligned on a common axis.

Still other embodiments provide such dual path control fittings where the fitting comprises a linear actuator operably coupled to the plunger and adapted to reciprocate the plunger between the first and second positions, or where the linear actuator is a threaded drive mechanism, or where the threaded drive mechanism comprises a rotatable threaded driver and a linearly translating traveler, or where the threaded drive mechanism comprises guide rods coupled to the traveler.

Yet other embodiments provide such dual path control fittings where the fitting body comprises a first sub and a second sub. The first sub defines a first portion of the bore including the bore opening and defining the first and second fitting body conduits. The second sub is joined to the first sub and defines a second portion of the bore including the first inlet.

Additional embodiments provide such dual path control fittings where the fitting comprises a frame assembled to the first sub and the linear actuator is mounted within the frame or where the frame comprises an end plate and a plurality of elongated frame members extending between the first sub and the end plate.

Other embodiments provide such dual path control fittings where the fitting comprises a bi-directional annular packing and a uni-directional packing mounted in the bore. The bi-directional packing is positioned axially between the first and second fitting body conduits and the first inlet. The uni-directional annular packing is positioned axially between the first and second fitting body conduits and the bore opening.

Still other embodiments provide such dual path control fittings where the fitting body has a flange union face at each of the first and second inlets and the outlet. The flange union faces are adapted to allow a flowline component to be joined to the fitting at the inlets and the outlet by a flange union.

Yet other embodiments provide such dual path control fittings where the fitting is rated for high pressure service.

In other aspects and embodiments, the subject invention provides wellhead assemblies comprising such novel dual path control fittings. Other embodiments provide such wellhead assemblies where the first path provides a path for flow of fluids and the second path provides a path for passage of tools or where the wellhead assembly is assembled on a wellhead and the second path is aligned on the primary axis of the wellhead and wellhead assembly.

In still other aspects and embodiments, the subject invention provides methods of servicing a well. The methods comprise providing such novel wellhead assemblies. The fitting plunger is set in its first the position to establish the first path through the fitting body and fluids are flowed into the well through the fitting along the first path. The fitting plunger is set in its second the position to establish the second path through the fitting body and tools are run into the well through the fitting along the second path.

Other embodiments provide such methods where the servicing of the well is a fracturing operation, the fluids are frac fluids, and the tools are wireline tools for plugging and perforating a liner in the well.

Other broad embodiments of the subject invention provide dual flow path control fitting for a system for fracturing a well having a fitting body and a cylindrical sleeve. The fitting body defines a cylindrical bore and a conduit. The cylindrical bore extends axially through the fitting body and provides a first inlet at one end thereof and an outlet at the other end thereof. The conduit extends radially through the fitting body into the bore and provides a second inlet. The cylindrical sleeve is mounted for reciprocation in the bore and has a conduit and a port. The conduit extends axially through the sleeve and communicates with the first inlet and the outlet to provide a first path through the fitting body from the first inlet to the outlet. The port is on the circumference of the sleeve. The sleeve is adapted to reciprocate between a first position and a second position. In the first position the port is aligned with the fitting body conduit to provide a second path through the fitting body from the second inlet to the outlet. In the second position the port is not aligned with the fitting body conduit and the second path is shut.

Other embodiments provide such dual path control fittings where the sleeve is hydraulically actuated.

Yet other embodiments provide such dual path control fittings where the fitting comprises seals and first and second hydraulic passages. The seals define first and second hydraulic chambers in the clearance between the sleeve and the bore. The first and second hydraulic passages extend through the fitting body and communicate with, respectively, the first and second hydraulic chambers.

Additional embodiments provide such dual path control fittings where the fitting body comprises a first sub and a second sub. The first sub defines a first portion of the bore including the first inlet and the first and second inlets. The second sub is joined to the first sub and defines a second portion of the bore including the fluid outlet.

Other embodiments provide such dual path control fittings where the fitting comprises a lock mechanism adapted to selectively hold the sleeve in its the first and second positions.

Still other embodiments provide such dual path control fittings where the sleeve comprises a flat on its outer circumference and first and second grooves at, respectively, the upper and lower extent of the flat. The fitting comprises a profiled rod. The profiled rod is mounted for reciprocation transversely across the flat and has a radially reduced portion and a radially enlarged portion. The profiled rod is adapted to reciprocate between an unlock position and a lock position. In the unlock position the radially reduced portion extends across the sleeve flat allowing the sleeve to move under the rod between its the first and second position. In the locked position the radially enlarged portion selectively engages the sleeve first groove and the sleeve second groove when, respectively, the sleeve is in its first position and its second position.

Yet other embodiments provide such dual path control fittings where the fitting body has a flange union face at each of the first and second inlets and the outlet. The flange union faces are adapted to allow a flowline component to be joined to the fitting at the inlets and the outlet by a flange union.

Additional embodiments provide such dual path control fittings where the fitting is rated for high pressure service.

In other aspects and embodiments, the subject invention provides wellhead assemblies comprising such dual path control fittings. Other embodiments provide such wellhead assemblies where the first path provides a path for passage of tools and the second path provides a path for flow of fluids or where the wellhead assembly is assembled on a wellhead and first path is aligned on the primary axis of the wellhead and wellhead assembly.

In yet other aspects and embodiments, the subject invention provides methods of servicing a well. The methods comprise providing such novel wellhead assemblies. The fitting sleeve is set in its first the position to establish the first path through the fitting body and tools are run into the well through the fitting along the first path. The fitting sleeve is set in its second position to establish the second path through the fitting body and fluids are flowed into the well through the fitting along the second path.

Other embodiments provide such methods where the servicing of the well is a fracturing operation, the fluids are frac fluids, and the tools are wireline tools for plugging and perforating a liner in the well.

Other broad aspects and embodiments on the subject invention provide shuttle valves for a system for fracturing a well. The shuttle valves comprise a fitting body and a cylindrical plunger. The fitting body defines a cylindrical bore, a first conduit, and a second conduit. The cylindrical bore extends axially through the fitting body and provides a fluid inlet at one end thereof and an opening at the other end thereof. The first conduit extends radially through the fitting body into the bore and provides a first fluid outlet. The second conduit extends radially through the fitting body into the bore and provides a second fluid outlet. The first and second fitting body conduits are axially spaced along the bore. The cylindrical plunger is mounted for reciprocation in the bore and has a conduit extending from one end of the plunger to a port on the circumference of the plunger. The plunger is adapted to reciprocate between a first position and a second position. In the first position the port is aligned with the first fitting body conduit to provide a first flow path from the fluid inlet to the first fluid outlet. In the second position the port is aligned with the second fitting body conduit to provide a second flow path from the fluid inlet to the second fluid outlet. The first flow path is shut when the plunger is in the second position and the second flow path is shut when the plunger is in the first position.

Other embodiments provide such shuttle valves where the port is normal to the axis of the plunger or where the plunger conduit has a sweeping 90° curve leading to the port. Still other embodiments provide such shuttle valves where the shuttle valve comprises a linear actuator operably coupled to the plunger and adapted to reciprocate the plunger between the first and second positions, or where the linear actuator is a threaded drive mechanism, or where the threaded drive mechanism comprises a rotatable threaded driver and a linearly translating traveler, or where the threaded drive mechanism comprises guide rods coupled to the traveler.

Yet other embodiments provide such shuttle valves where the fitting body comprises a first sub and a second sub. The first sub defines a first portion of the bore including the bore opening and the first and second fitting body conduits. The second sub is joined to the first sub and defines a second portion of the bore including the fluid inlet.

Additional embodiments provide such shuttle valves where the shuttle valve comprises a frame assembled to the first sub and the linear actuator is mounted within the frame or where the frame comprises an end plate and a plurality of elongated frame members extending between the first sub and the end plate.

Other embodiments provide such shuttle valves where the shuttle valve comprises a bi-directional annular packing and first and second uni-directional packings mounted in the bore. The first uni-directional packing is positioned axially between the fluid inlet and the first fitting body conduit. The bi-directional packing is positioned axially between the first and second fitting body conduits. The second uni-directional packing is positioned to axially between the second fitting body conduit and the bore opening.

Still other embodiments provide such shuttle valves where the fitting body has a flange union face at each of the fluid inlet and the first and second fluid outlets. The flange union faces are adapted to allow a flowline component to be joined to the shuttle valve at the inlet and the outlets by a flange union.

Yet other embodiments provide such shuttle valves where the fitting is rated for high pressure service.

In other aspects and embodiments, the subject invention provides zipper manifolds comprising such novel shuttle valves and systems for fracturing a well comprising such novel zipper manifolds.

In still other aspects and embodiments, the subject invention provides methods for servicing a plurality of wells. The methods comprise providing a novel shuttle valve. The plunger of the shuttle valve is set in its first position to establish the first path through said fitting body. Well treatment fluid then is flowed through the shuttle valve along the first path, either from a first well or into the first well. The plunger is set in its second position to establish the second path. Well treatment fluid then is flowed through the shuttle valve along the second path, either from a second well or into the second well.

Finally, still other aspects and embodiments of the invention provide such dual path flow control fittings and shuttle valves having various combinations of such features as will be apparent to workers in the art.

Thus, the present invention in its various aspects and embodiments comprises a combination of features and characteristics that are directed to overcoming various shortcomings of the prior art. The various features and characteristics described above, as well as other features and characteristics, will be readily apparent to those skilled in the art upon reading the following detailed description of the preferred embodiments and by reference to the appended drawings.

Since the description and drawings that follow are directed to particular embodiments, however, they shall not be understood as limiting the scope of the invention. They are included to provide a better understanding of the invention and the manner in which it may be practiced. The subject invention encompasses other embodiments consistent with the disclosure provided herein.

BRIEF DESCRIPTION OF THE DRAWINGS

FIG. 1A (prior art) is a schematic illustration of an early stage of a plug and perf fracturing operation which shows a wireline tool string 20 deployed through a wellhead assembly 8 into a liner assembly 10, where tool string 20 includes a perf gun 21, a setting tool 22, and a frac plug 23a.

Figure 1A:
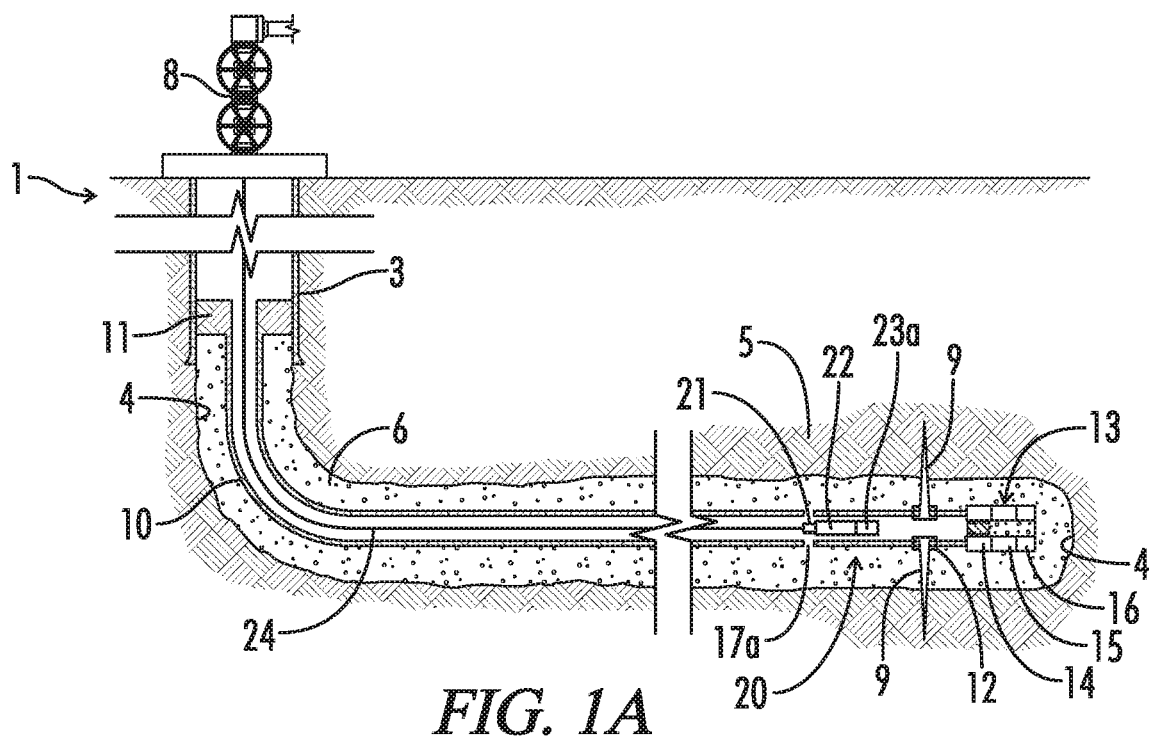

In the drawings and description that follows, like parts are identified by the same reference numerals. The drawing figures also are not necessarily to scale. Certain features of the embodiments may be shown exaggerated in scale or in somewhat schematic form and some details of conventional design and construction may not be shown in the interest of clarity and conciseness. For example, certain features and components of the embodiments shown in the figures have been omitted to better illustrate the remaining components.

DESCRIPTION OF ILLUSTRATIVE EMBODIMENTS

The invention, in various aspects and embodiments, is directed generally to fittings for controlling fluid flow and allowing access for tool operations that may be used in systems for fracturing oil and gas wells and other high-pressure fluid transportation systems. Various specific embodiments will be described below. For the sake of conciseness, however, all features of an actual implementation may not be described or illustrated. In developing any actual implementation, as in any engineering or design project, numerous implementation-specific decisions must be made to achieve a developer's specific goals. Decisions usually will be made consistent within system-related and business-related constraints. Specific goals may vary from one implementation to another. Development efforts might be complex and time consuming and may involve many aspects of design, fabrication, and manufacture. Nevertheless, it should be appreciated that such development projects would be routine effort for those of ordinary skill having the benefit of this disclosure.

Figure 3:
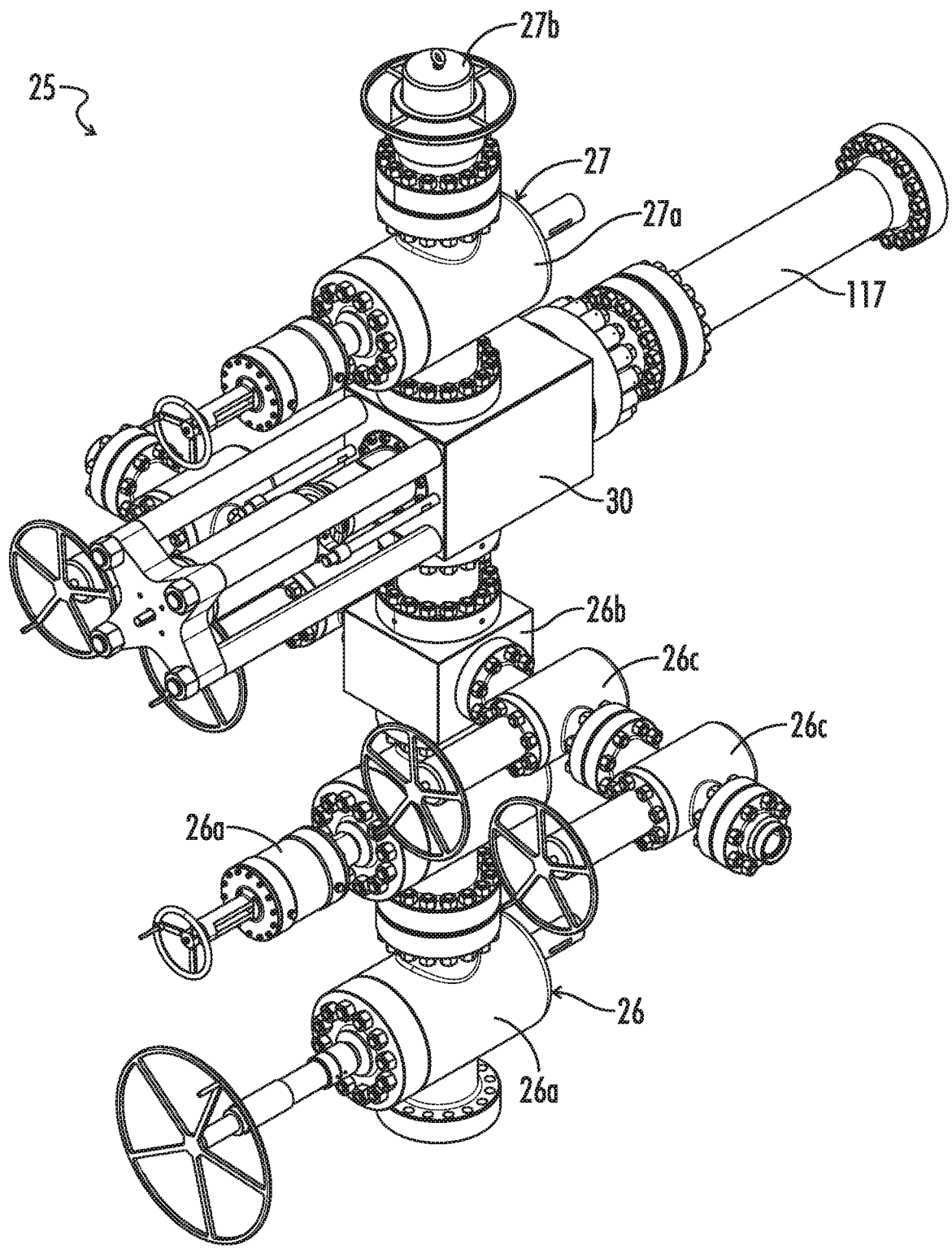
FIG. 3 is an isometric view of a first preferred embodiment 25 of the novel wellhead assemblies of the subject invention comprising a first preferred embodiment 30 of the novel dual path control fittings of the subject invention.
Figure 4A:
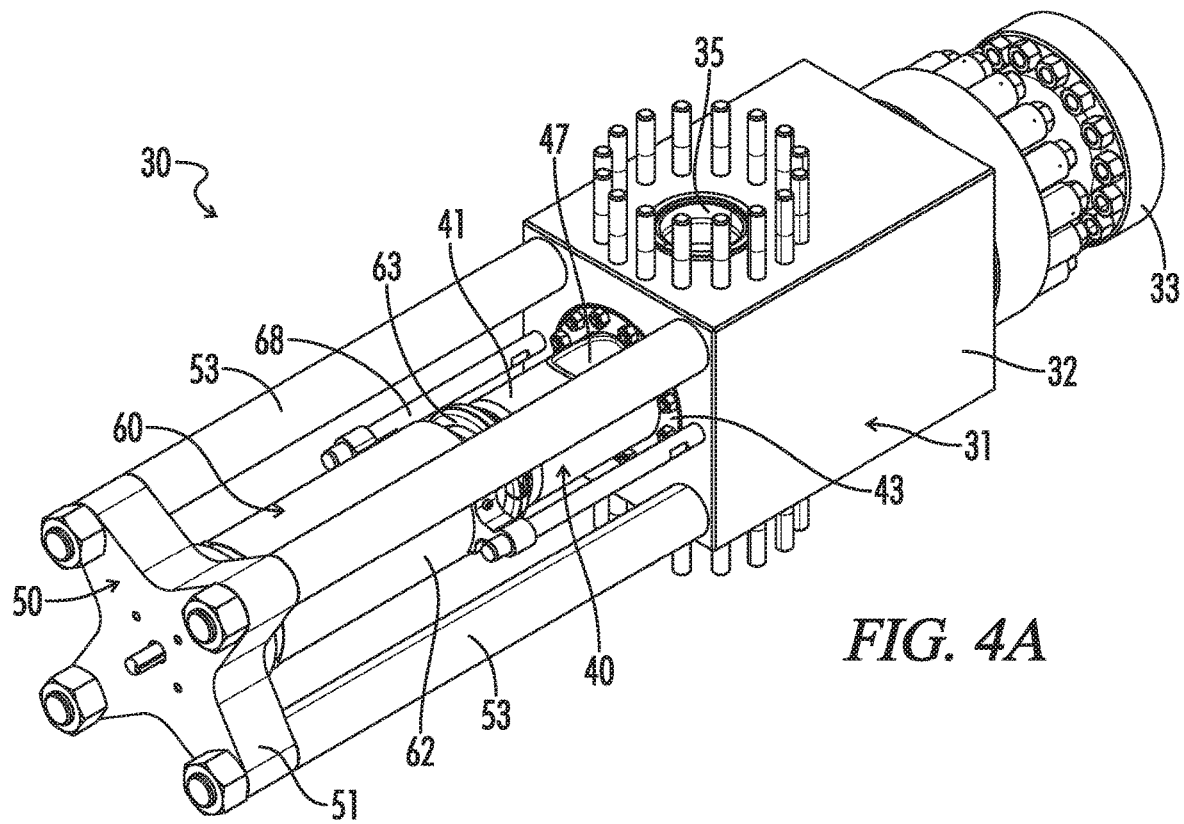
FIG. 4A is an isometric view of fitting 30 shown in FIG. 3, showing fitting 30 in its fracturing position.
Figure 4B:
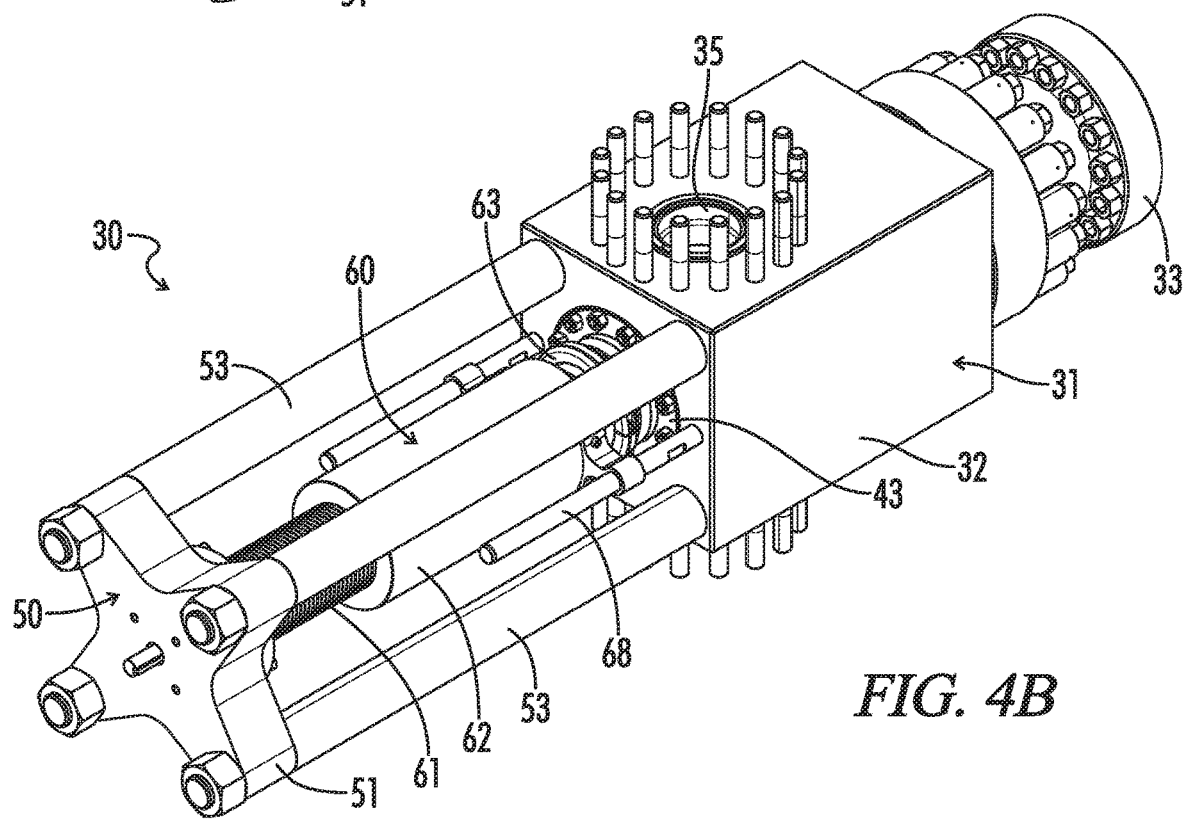
FIG. 4B is an isometric view of fitting 30 showing fitting 30 in its tool operations position.
Figure 5A:
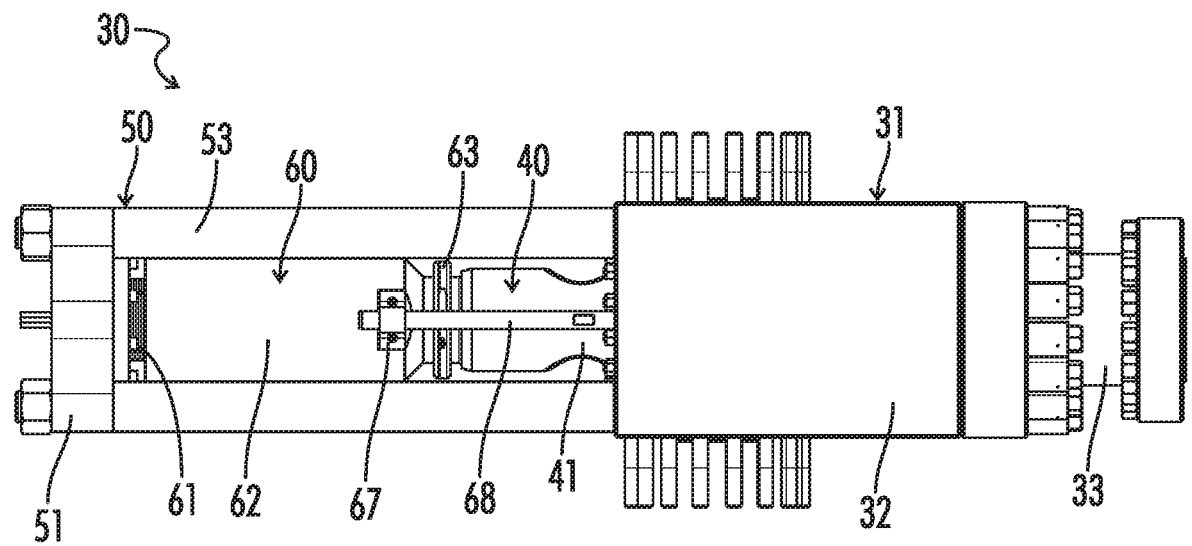
FIG. 5A is an elevational view of fitting 30 shown in FIGS. 3, 4A, and 4B, showing fitting 30 in its fracturing position.
Figure 5B:
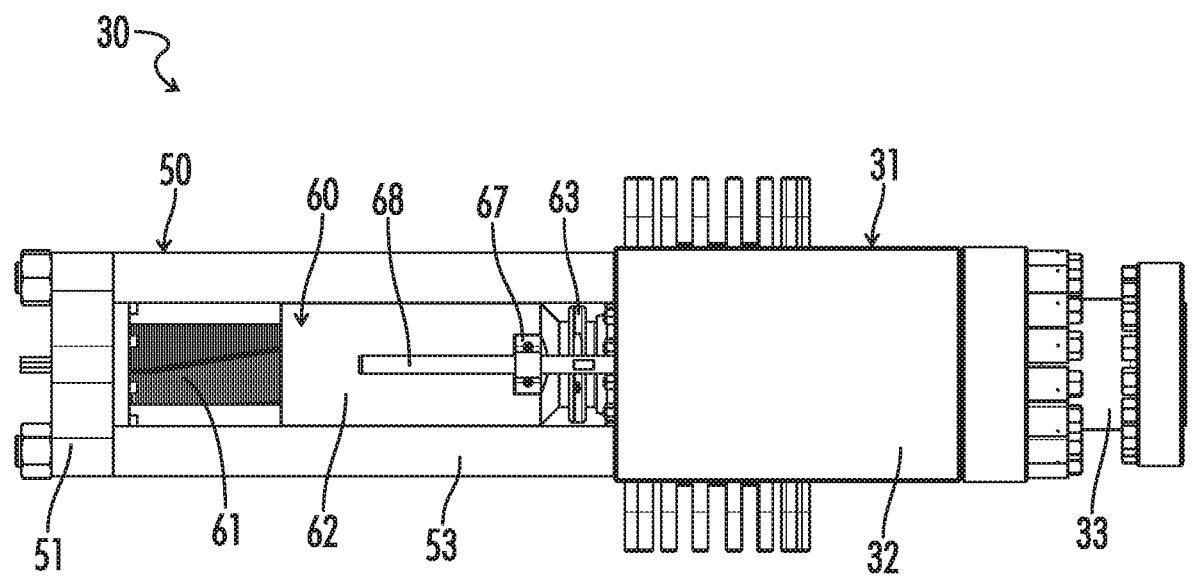
FIG. 5B is an elevational view of fitting 30 showing fitting 30 in its tool operations position.

A first preferred embodiment 25 of the novel wellhead assemblies is shown in FIG. 3. Wellhead assembly 25 will be mounted on top of a well's wellhead (not shown) invariably such that the primary axes of their conduits are aligned. Put another way, the wellhead assembly provides a "straight shot" into and out of the wellhead. The wellhead provides the primary structural support and pressure containment for the primary casing and other tubulars extending into the well bore. It typically comprises a casing head, other heads and hangers for suspending intermediate casings and production tubulars, and pressure gauges to monitor pressure within the various annuli around the tubulars.

Wellhead assembly 25 generally comprises a flow control kit 26, a first preferred embodiment 30 of the novel dual path control fittings, and a tool insertion kit 27. It may be installed on a wellhead and used in fracturing systems such as that illustrated in FIG. 2. As described further below, during fracturing operations fitting 30 will control flow of frac fluid into the well and will allow tools to be run into the well.

Flow control kit 26 is of conventional design. As illustrated in FIG. 3, flow control kit 26 has a pair of redundant master shut-off valves 26a that can be used to shut off all flow into and out of the well. They will be mounted on the wellhead (not shown). Flow control kit 26 also has a cross fitting 26b mounted on top of the upper master shut-off valve 26a. Cross fitting 26b allows for the diversion of flowback out of the well and allows treatment and pump-down fluids to be introduced into the wellhead assembly 25. Redundant "wing" shut-off valves 26c are assembled to the cross fitting to control flow through suitable flow lines (not shown) leading into and out of the cross fitting 26b.

Fitting 30 is assembled to on top of flow control kit 26, for example, by a flange union joining it to a short pup joint on top of cross fitting 26b. A frac line, such as flow line 117, is joined to fitting 30 by a flange union allowing frac fluid to be introduced into fitting 30 during fracturing operations. Tool insertion kit 27 is assembled on top of fitting 30, for example, by a flange union.

Figure 1B:
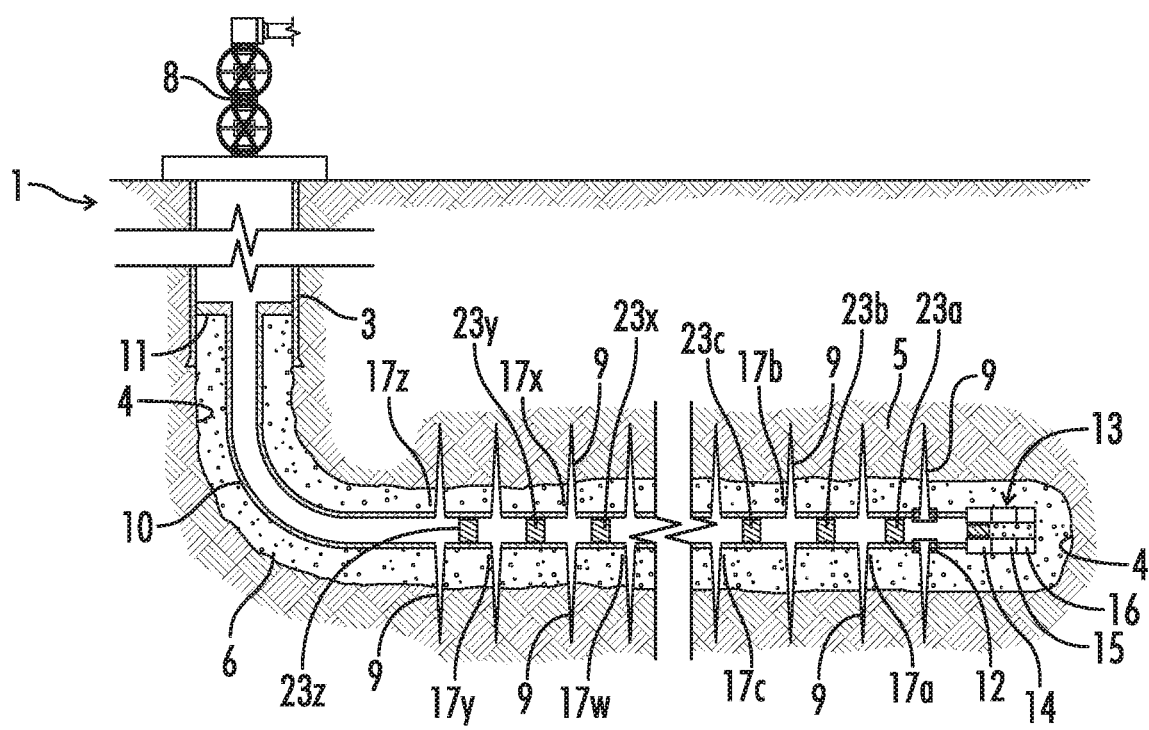
FIG. 1B (prior art) is a schematic illustration of liner assembly 10 after completion of the plug and perf fracturing operation, but before removal of plugs 23 from liner 10.

Tool insertion kit 27 is of conventional design. As illustrated in FIG. 3, tool insertion kit 27 comprises a swab valve 27a and a tree cap 27b. Conventional components will be assembled to tree cap 27b to allow insertion of tools into wellhead assembly 25. For example, if a wireline operation such as that illustrated schematically in FIG. 1 is required, such components commonly will include a staff assembly, stuffing box, and lubricator.

It will be appreciated that the novel wellhead assemblies may incorporate other conventional components, such as pressure relief valves or bleed-off lines. They also may and typically will incorporate, for example, gauges and other monitoring equipment. In general, they may include any of the junction fittings, control fittings, monitoring equipment, and other components as are used conventionally in wellhead assemblies according to the design and needs of the well and preferences of the operator.

Fitting 30 and the other components of wellhead assembly 25 located above the master valves also may be referred to as a "frac stack" given that they are installed to allow fracturing operations to be conducted. They typically will have replaced other "stacks," such as the stack of components used to drill the well and will be replaced by a stack of components that will allow production fluids to flow from the well. It also will be appreciated that there are no standard lists of components that comprise a "flow control kit" or a "tool insertion kit." Those terms are used herein and in the industry for convenience. For example, flow control kit 26 is exemplified as including a cross fitting and wing shut-off valves. Those components may instead be incorporated into tool insertion kit 27. In other words, as will be appreciated by workers in the art, there is flexibility in the relative placement of fitting 30 and many other components in a wellhead assembly.

Fitting 30 is shown in greater detail in FIGS. 4-8. As shown therein, fitting 30 generally comprises a fitting body 31, a plunger assembly 40, a frame 50, and a drive mechanism 60. As described further below, a ported plunger 41 in plunger assembly 40 is actuated by drive mechanism 60 to selectively open one of two paths through fitting 30, one path allowing frac fluids to flow through fitting 30 and the other allowing tool operations to be conducted through fittings 30.

Fitting body 31 provides the base to which the other components are assembled, directly or indirectly, and in large part absorbs the pressure of hydraulic fluids passing through fitting 30. Fitting body 31 preferably comprises a first sub or fitting block 32 and a second sub or bonnet 33

As best appreciated from the cross-sectional views of FIG. 6, fitting block 32 and bonnet 33 collectively define a cylindrical bore 34 extending along the primary axis of fitting body 31 and fitting 30. One end (right) of bore 34, the end on bonnet 33, provides a first inlet into which frac fluid may be flowed. The other end (left) of bore 34 on fitting block 32 provides an opening through which plunger assembly 40 extends and reciprocates.

Fitting block 32 defines a first cylindrical conduit 35 and a second cylindrical conduit 36. First conduit 35 extends radially inward from the top of fitting block 32 into bore 34. Second cylindrical conduit 36 extends radially inward from the bottom of fitting 32 into bore 34. Preferably first conduit 35 and second conduit 36 are aligned along a common axis and preferably that axis is aligned with the primary axis of well head assembly 25. As will be appreciated from the discussion that follows, first conduit 35 provides a second inlet communicating with tool insertion kit 27, thus allowing tools, such as wireline tool string 20, to be run into fitting 30. Second conduit 36 provides an outlet communicating with flow control kit 26, thus allowing frac fluid to flow, and wireline or other tools to pass from fitting 30 into flow control kit 26 and ultimately the well.

Flange union faces are provided around the mating ends of fitting block 32 and bonnet 33 allowing fitting block 32 and bonnet 33 to be joined by a flange union. Flange union faces also are provided around the first inlet on bonnet 33 and around the second inlet and outlet on fitting block 32. Fitting 30 thus may be assembled into wellhead assembly 25, and other flowline components, such as frac line 117, may be joined to fitting 30 by flange unions.

Fitting block 32 preferably, as exemplified, is a solid rectangularly shaped component, while bonnet 33 is a generally tubular-shaped component having flanges at each end. Such configurations can be designed readily to contain high pressures and tolerate corrosion and erosion, while being well suited for accommodating flange union faces. Fitting block 32 and bonnet 33, however, may incorporate other conventional designs. Fitting block 32, for example, also may have a generally tubular shape with flanges and flats as necessary. Fitting block 32 and bonnet 33 also may incorporate features allowing fitting body 31 to be joined to other flowline components by other types of unions or connections. Moreover, while its two-piece design allows for easy fabrication and machining of its bores, union faces, and other design features, fitting body 31 also may have a unitary construction or be assembled from a greater number of subs.

Figure 6A:
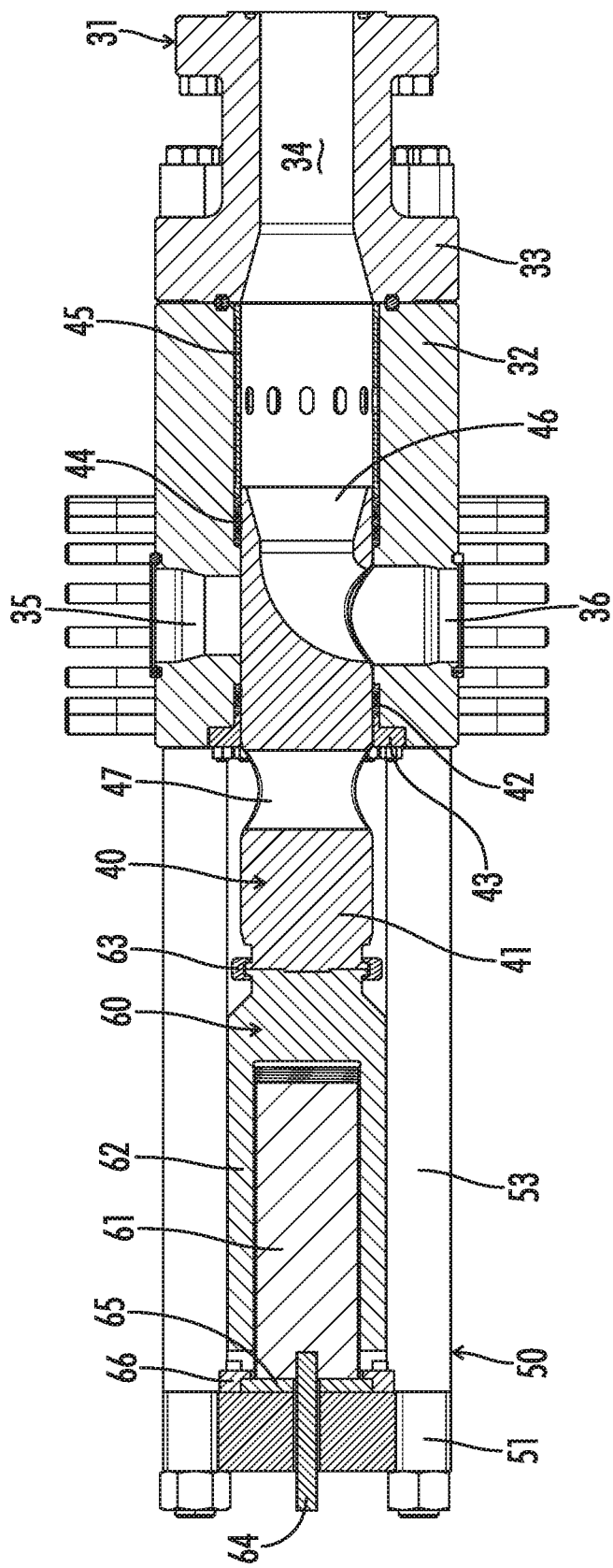
FIG. 6A is an axial cross-sectional view of fitting 30 shown in FIGS. 3 through 5B, showing fitting 30 in its fracturing position.
Figure 6B:
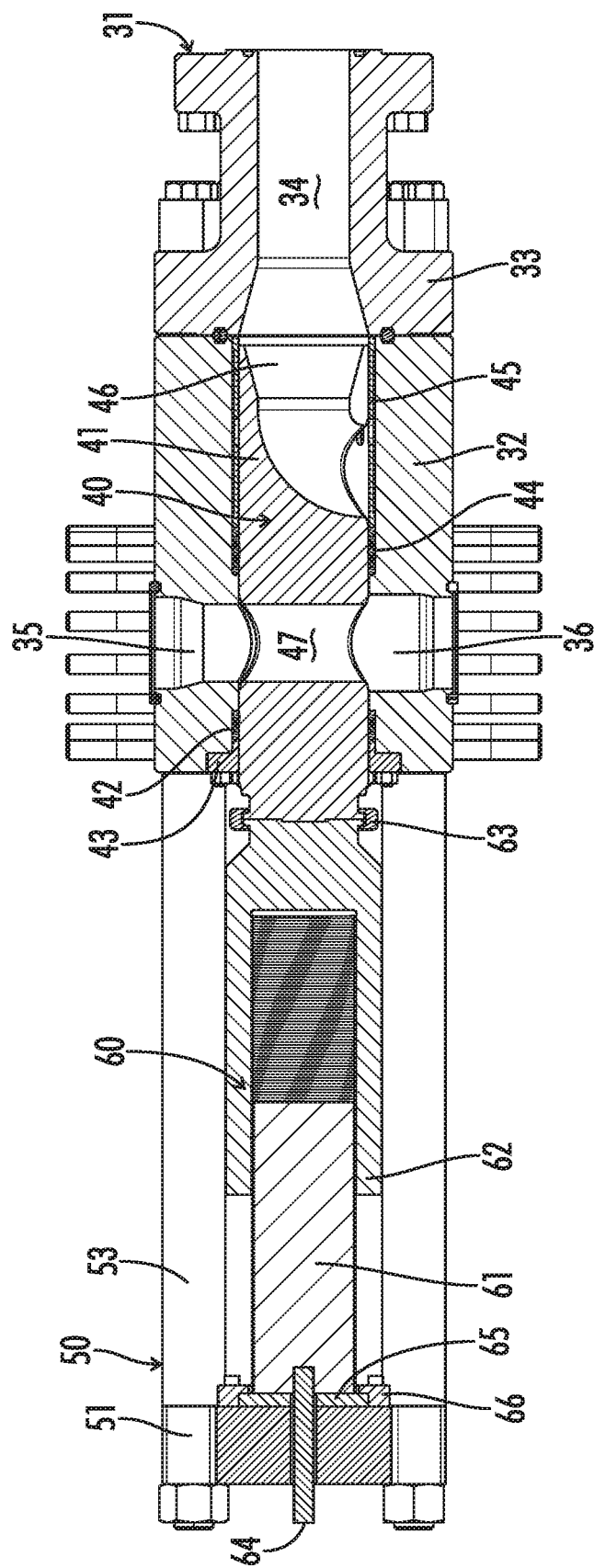
FIG. 6B is an axial cross-sectional view of fitting 30 showing fitting 30 in its tool operations position.
Figure 7:
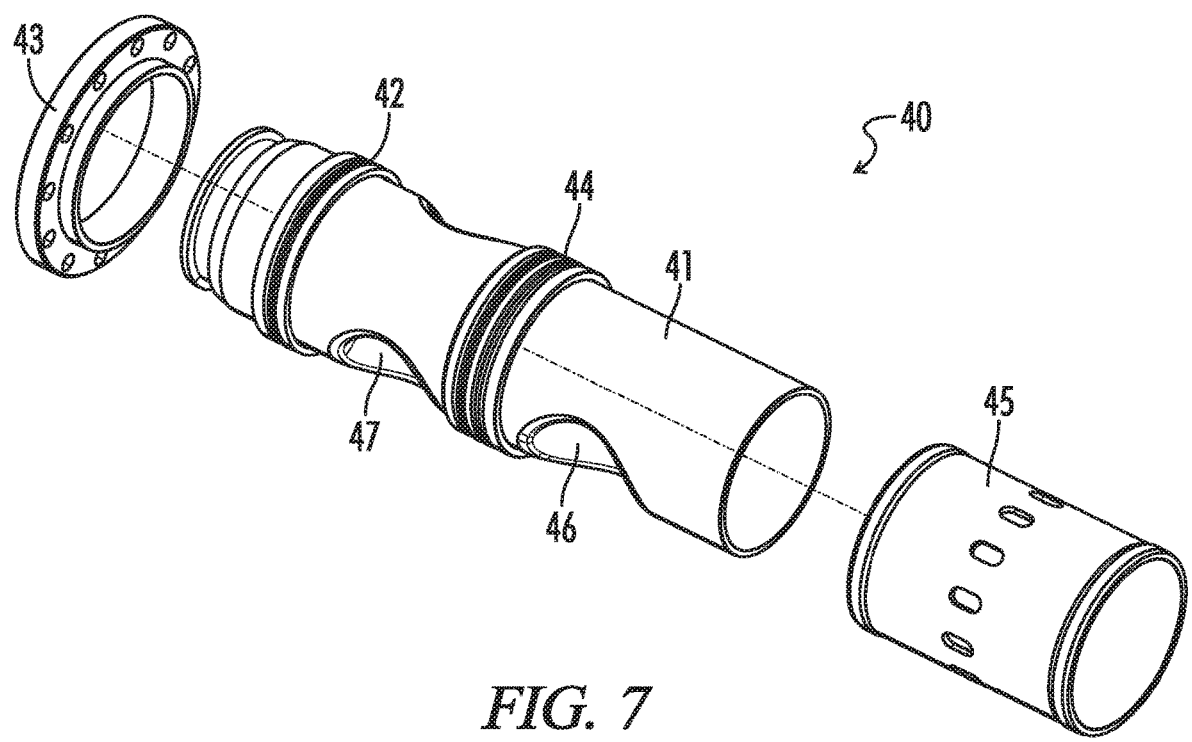
FIG. 7 is an isometric, partially exploded view of a plunger assembly 40 of fitting 30.

Plunger assembly 40, as seen best in the cross-sectional views of FIG. 6 and the isometric, partially exploded assembly view of FIG. 7, generally comprises ported plunger 41, a uni-directional packing 42, a packing spacer 43, a bi-directional packing 44, and a packing sleeve 45. Plunger 41 is generally cylindrical, one end (left) being solid and the other end (right) being open. It is mounted for reciprocation in the portion of bore 34 extending through fitting block 32. Plunger 41 is provided with two conduits: a first or frac conduit 46 and a second or tool operations conduit 47.

Frac conduit 46 initially extends axially from the open end of plunger 41 and then turns downward toward a port on the circumference of plunger 41. Preferably, as exemplified, the port is normal to the primary axis of plunger 41 and bore 34, allowing it to align exactly with second fitting body conduit 36, both having the same diameter. Conduit 46 also preferably makes a sweeping 90° turn toward the port to encourage more laminar flow into wellhead kit 26. Frac conduit 46 may be formed from intersecting straight-line bores, however, and that may be preferred for easier machining.

Tool operations conduit 47 extends transversely across plunger 41 proximate to the solid or closed end (left) of plunger 41. Preferably, as exemplified, tool operations conduit 47 is normal to the primary axis of plunger 41 and bore 34. It thus extends along the primary axis of wellhead assembly 25 and, as described further below, provides a straight-line path through fitting 30 from tool insertion kit 27 into flow control kit 26.

Tool operations conduit 47 also, as exemplified, preferably is isolated from frac conduit 46. That is, the two conduits 46 and 47 do not communicate with each other. That arrangement allows fitting 30 to have a more compact and simpler design. If desired, tool operations conduit may extend through frac conduit 46. But as will be appreciated from the discussion that follows, other factors being the same, such an arrangement would require additional packings and lengthening of fitting body 31.

As best appreciated by comparing FIGS. 6A and 6B, plunger 41 is mounted for reciprocation between a first or fracturing position (leftward) and a second or tool operations position (rightward). When plunger 41 is in its fracturing position, as shown in FIG. 6A, the port of plunger frac conduit 46 is aligned with second fitting body conduit 36. Plunger 41 thus establishes a first path through fitting 30 leading from the frac inlet at the open end of bore 34 in bonnet 33, through frac conduit 46 of plunger 41, and to the outlet of second fitting body conduit 36.

That first path allows frac fluid to be flowed into fitting 30 and flow control kit 26 and ultimately into the well. Since plunger frac conduit 46 is provided with a right-angle turn, fluid will flow from fitting 30 into flow control kit 26 along its vertical, primary axis and in alignment with the conduits provided therein. Preferably, as exemplified, the portion of bore 34 in bonnet 33 flairs radially outward leading into plunger frac conduit 46, which in turns flairs radially inward leading into the turn toward the plunger port. Thus, an enlarged diameter portion is formed in the first path to allow a reduction in flow velocity and a pressure increase leading into the turn toward the plunger port.

When plunger 41 is in its tool operations position, as shown in FIG. 6B, tool operations conduit 47 of plunger 41 is aligned with first and second fitting body conduits 35 and 36. Plunger 41 thus establishes a second path through fitting 30 leading from the tool operations inlet of first fitting body conduit 35, through tool operations conduit 47 of plunger 41, and to the outlet of second fitting body conduit 36. That second path allows tools, such as wireline tool string 20, to be run along a straight line through fitting 30 from tool insertion kit 27 into flow control kit 26 and ultimately into the well. When plunger 41 is in its tool operations position, the frac path will be shut off, and similarly, when it is in its frac position, the tool operations path will be shut off.

Given that the pressures required for fracturing a well can be quite high, the novel flow control fittings preferably comprise robust sealing elements. For example, uni-directional packing 42 and bi-directional packing 44 are provided to seal the clearance between plunger 41 and bore 34 of fitting block 32. Preferably, as shown, they are mounted in annular glands provided in bore 34.

Uni-directional packing 42 is held in its gland by an annular packing spacer 43. Packing spacer 43 is of conventional design. It has a short, open-cylindrical body, the opening therein allowing reciprocation of plunger 41 through packing spacer 43. Packing spacer 43 is mounted in a suitably profiled annular rabbet in fitting body 32 extending around the open (left) end of bore 34. Its inner end bears on packing 42. Packing spacer 43 is secured by threaded connectors or other connections allowing it to be removed for servicing or replacement of packing 42.

Similarly, bi-directional packing 44 is held in its gland by packing sleeve 45. Packing sleeve 45 is an open-cylindrical body through which plunger 41 can reciprocate. It is mounted in an elongated annular rabbet in fitting body 32 that extends around the other (right) end of bore 34. The inner end of packing sleeve bears on packing 44. Bonnet 33, when joined to fitting body 32, will bear on packing sleeve 45, retaining it in bore 34. Openings may be provided in packing sleeve 45 as finger holds to allow it to be pulled more easily from bore 34 for replacement of packing 44. Packings 32 and 34, however, may be retained in their glands by other suitable means.

Uni-directional packing 42 is positioned axially between one (the left) end of fitting block 32 and first and second fitting body conduits 35 and 36. It is designed to hold pressure on its right side as may be generated, for example, when fluid is flowed through frac conduit 46 during fracturing operations. Bi-directional packing 44 is positioned axially between first and second fitting body conduits 35 and 36 and the other (right) end of fitting block 32. It is designed hold pressure on both of its sides. For example, and depending on conditions and upstream controls in frac line 117, either side of bi-directional packing 44 may be exposed to pressure during tool operations.

Packings 42 and 44 typically comprise a collection of various annular components, and many different combinations of conventional packing elements may prove suitable. Uni-directional packing 42 may comprise, for example, and starting with its pressure side, a header ring, a pair of pressure rings, and a backup ring. Bi-directional packing 44 may comprise, for example, a backup ring, a pair of pressure rings, a bi-directional header ring, another pair of pressure rings, and another backup ring. The pressure rings are designed to seal the clearance between plunger 41 and bore 34 at higher pressures while header rings are designed to seal at lower pressures. Header rings also provide a bearing surface to minimize damage to the sealing rings as plunger 41 is reciprocated. Backup rings are designed to minimize extrusion of the pressure seals under pressure.

Many suitable designs for packing elements are known and are available commercially. Reciprocating pressure rings may be any of many conventional elastomeric seal ring designs, such as the many conventional variations of cup-style and squeeze rings. Header rings typically will provide a relatively flat pressure face and will be profiled to fit into a pressure ring on its low-pressure side. The pressure and header rings may be fabricated from elastomers such as nitrile butadiene rubber (NBR), hydrogenated nitrile butadiene nitrile rubber (HNBR), fluoroelastomers such as Viton® and Dyneon™, and tetrafluoroethylene propylene rubbers, such as Aflas™, polyurethane, and fluorosilicone. The choice of materials will be driven by conventional considerations, most commonly the nature of the fluids, the temperatures, and the pressures to which the seals will be exposed. For example, fluoroelastomers may be preferred for oily and corrosive fluids, and harder nitrile and polyester rubbers may be preferred for higher pressure seals. Header rings commonly will be fabricated from somewhat harder elastomers than those used in pressure rings.

Anti-extrusion, backup rings will be positioned on the low-pressure side of the pressure seals. They typically are made of a hard, inelastic material, such as steel, brass, and other metals, or from engineering plastics, such as polycarbonates, Nylon 6, Nylon 66, and other polyamides, including fiber reinforced polyamides such as Reny polyamide, polyether ether ketone (PEEK), and polyetherimides such as Ultem®. They also may be made of harder formulations of the same basic elastomer from which the seals are made and will be sized and configured to shut off potential extrusion paths for the pressure seals. Some pressure seals, however, incorporate an integral backup ring designed to support and stabilize elastomeric sealing lips. They may be used instead of or in addition to separate backup rings.

Figure 8A:
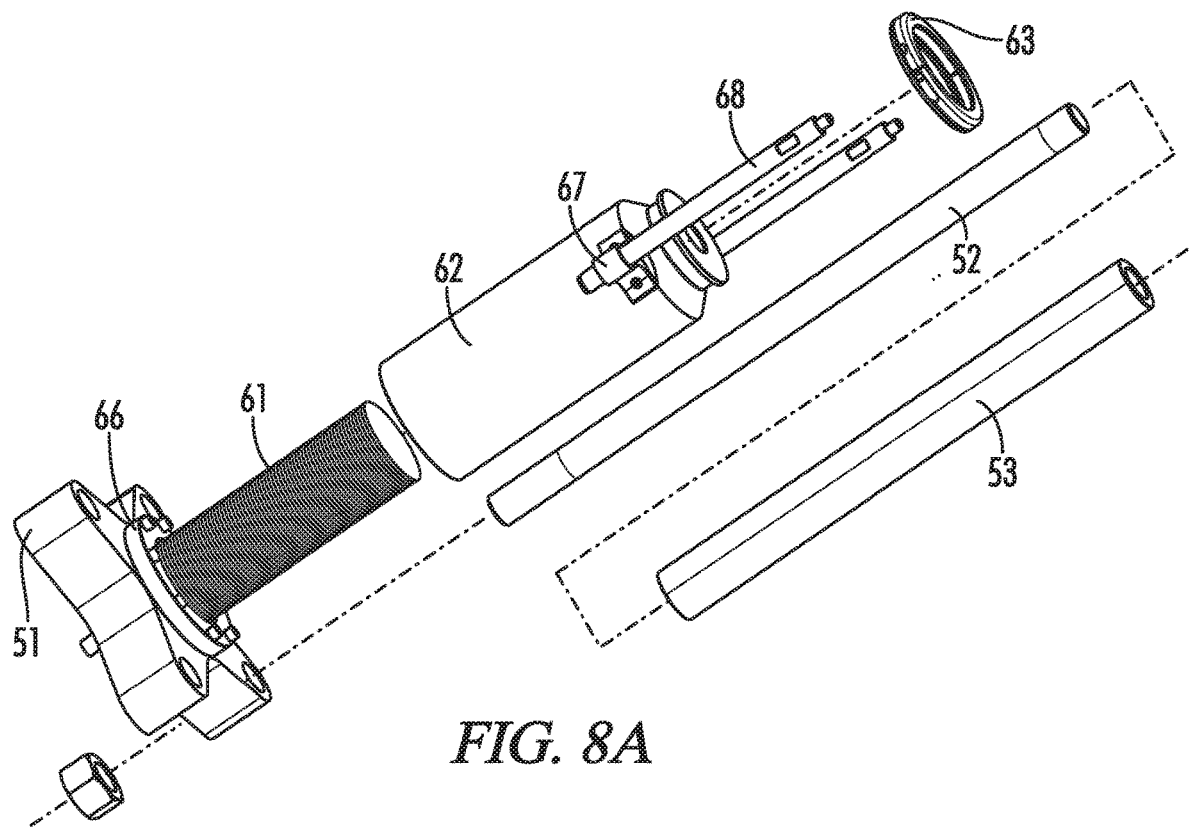
FIG. 8A is an isometric, partially exploded view of a frame 50 and a drive mechanism 60 of fitting 30.
Figure 8B:
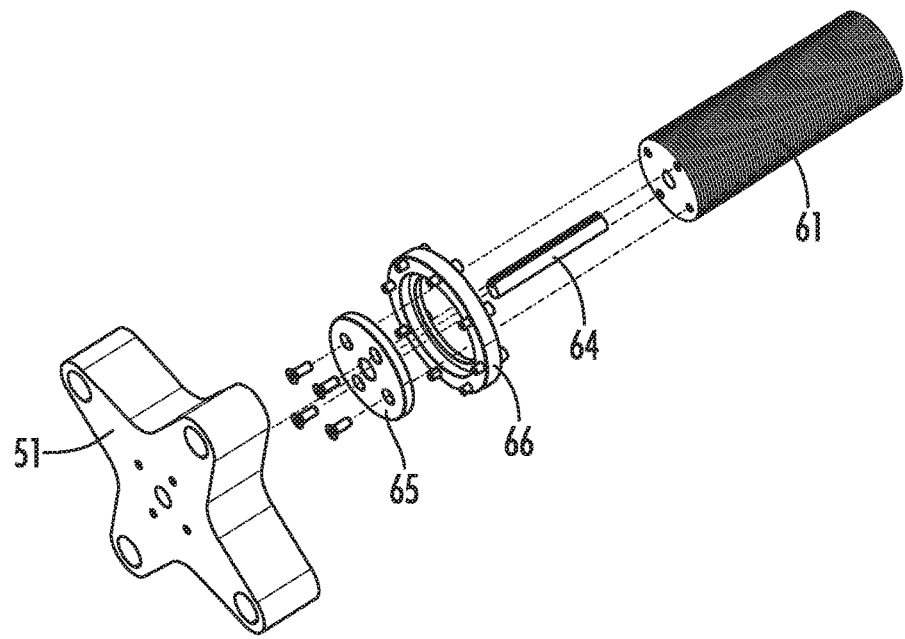
FIG. 8B is an isometric, exploded view of a portion of drive mechanism 60 shown in FIG. 8A.

Frame 50 is assembled to fitting bock 32 and provides the primary structure to which drive mechanism 60 of fitting 30 is mounted. As shown in FIG. 8A, frame 50 generally comprises an end plate 51, four stay rods 52, and four stay tubes 53. End plate 51 has four lobes to reduce its weight, but it precise shape is not critical and may be adapted as needed. Stay rods 52 extend through stay tubes 53 and have threads at both ends. One end (right) is threaded into fitting block 32. The other end (left) of stay rods 52 extends through openings in end plate 51. Nuts may be threaded onto stay rods 52 to generate load on end plate that is transferred to fitting block 32 through stay tubes 53. Frame 50 thus provides a rigid, secure mounting structure in which drive mechanism 60 may be mounted.

Drive mechanism 60 is used to move plunger 41 back and forth between its frac and tool operations positions. As seen best in FIG. 8, it is a linear actuator and generally comprises a driver 61 and a traveler 62. Driver 61 is generally cylindrically shaped and has external threads. Traveler 62 also is generally cylindrically shaped, but it has an axially extending bottomed bore with mating internal threads. Driver 61 is threaded into traveler 62. Traveler 62 is coupled to plunger 41 by, for example, a clamp 63. Clamp 63 is a two-piece clamp. Each piece is semi-annular and has an inner groove or channel that allows the pieces to fit around mating rims at the ends of traveler 62 and plunger 41. The ends of the clamp pieces are connected by, for example, threaded connectors. Thus, rotation of driver 61 in alternate directions will cause traveler 62 to reciprocate linearly, which in turn causes plunger 41 to reciprocate in bore 34 of fitting block 32.

More particularly, a drive shaft 64 extends through suitable openings in frame end plate 51 and a bushing 65 and into a cylindrical hole extending axially into threaded driver 61. drive shaft 64 and the axial hole in driver 61 have mating lateral grooves allowing them to be rotationally coupled by aligning the grooves and inserting an elongated key therein. The other end of drive shaft 64 will be coupled to a source of rotational power, such as an electric motor (not shown). The power source may be mounted on end plate 51 of frame 50 and may be operated by conventional manual or automatic control systems. Drive shaft 64 also may be hand driven, for example, through a wheel crank, but that may not be preferred unless fitting 30 is reasonably accessible to workers.

Threaded driver 61 rotates on bushing 65, so bushing 65 preferably will be made of bronze or another somewhat softer metal than that used to fabricate threaded driver 61. Bushing 65 is captured between threaded driver 61 and end plate by a keeper 66 that is mounted on end plate 51 by threaded connectors. As driver rotates, traveler 62 is prevented from rotating by guide blocks 67 and guide rods 68. Guide blocks 67 are mounted on flats on opposite sides of traveler 62 by, for example, threaded connectors. Guide rods 68 are threaded at one of their ends end into fitting block 32 and extend through passages in guide blocks 67. Traveler 62 thus is prevented from rotating with driver 61, but can reciprocate freely along its axis on guide rods 68.

Drive mechanism is believed to provide efficient, reliable, and cost-effective actuation of plunger 41. Other conventional linear actuators, however, may be used to actuate plunger 41. For example, hydraulic, pneumatic, or electromechanical linear is actuators may be suitable. Similarly, other frame configurations, such as a flanged, cylindrical tube may be used to mount drive mechanism 60 or to accommodate other drive mechanisms. Frame 50, being open, allows the position of traveler 62 and, therefore, the state of fitting 30 to be determined readily by visual inspection. Color coatings or other indicia may be provided on traveler 62, stay tubes 53, or guide rods 68, for example, to more easily correlate the position of traveler 62 to the state of fitting 30 as being either in its frac condition or tool operations condition.

It will be appreciated that the novel wellhead assemblies can provide significant advantages over conventional wellhead assemblies. Embodiments of the novel fittings such as fitting 30, for example, can simplify the construction and operation of wellhead assemblies and zipper manifolds.

Figure 2:
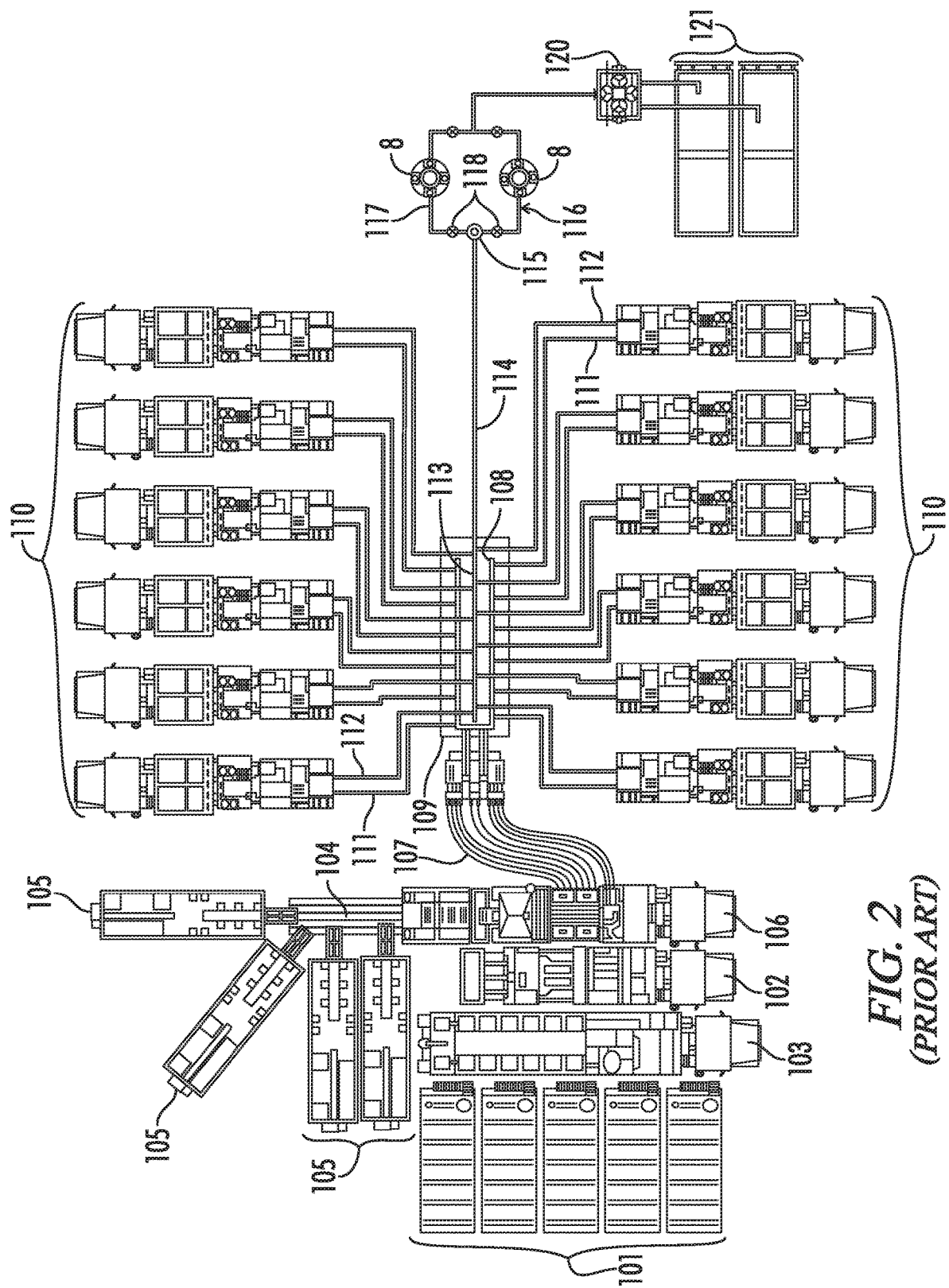
FIG. 2 (prior art) is a schematic view of a system for fracturing a well and receiving flowback from the well, which system includes conventional well heads 8.

During fracturing operations, for example, wellhead assembly 8 in the conventional system illustrated in FIG. 2 includes a tee or other junction fitting commonly assembled above a pair of master shut-off valves. The main bore of the tee fitting is aligned with the primary axis of wellhead assembly 8 with the branch bore extending to a side of the tee. Another shut-off valve, or if redundancy is desired, two shut-off valves are connected to the side of the tee or elsewhere in frac line 117 to control flow of frac fluid into the tee fitting through the branch bore. Wireline tool string 20 can be run into well 1 through the main bore of the tee fitting. Wellhead assembly 8 also often will have another shut-off or, if redundancy is desired, two shut-off or "swab" valves connected on top of the tee fitting.

Embodiments of the novel fittings, however, eliminate the need for separate shut-off valves to control flow and access through a tee or other type of junction fitting or, when desired, to provide redundant control. Fitting 30 in wellhead assembly 25, for example, controls flow of frac fluids into wellhead assembly 25 as well as allowing tool operations to be conducted through it. Fitting 30 selectively provides two separate paths during fracturing operations—one for the flow of frac fluids and one allowing the passage of wireline and other tools—through the same fitting.

Moreover, the shut-off valves used to control flow of frac fluid into the tee fitting and in the tool insertion kits of conventional wellhead assemblies typically are gate valves. Embodiments of the novel fittings can provide that functionality without many of the problems attendant to gate valves. For example, packings 42 and 44 require minimal grease, yet plunger 41 is far less prone to seizing. Maintenance is simplified, and issues created by grease being blown into the well are minimized. Fitting 30 also lacks areas where sand can build up and interfere with operation of plunger 41. Conventional gate valves have a groove into which the gate of a gate valve must enter, and sand can build up in the groove, interfering with movement of the gate.

Figure 9:
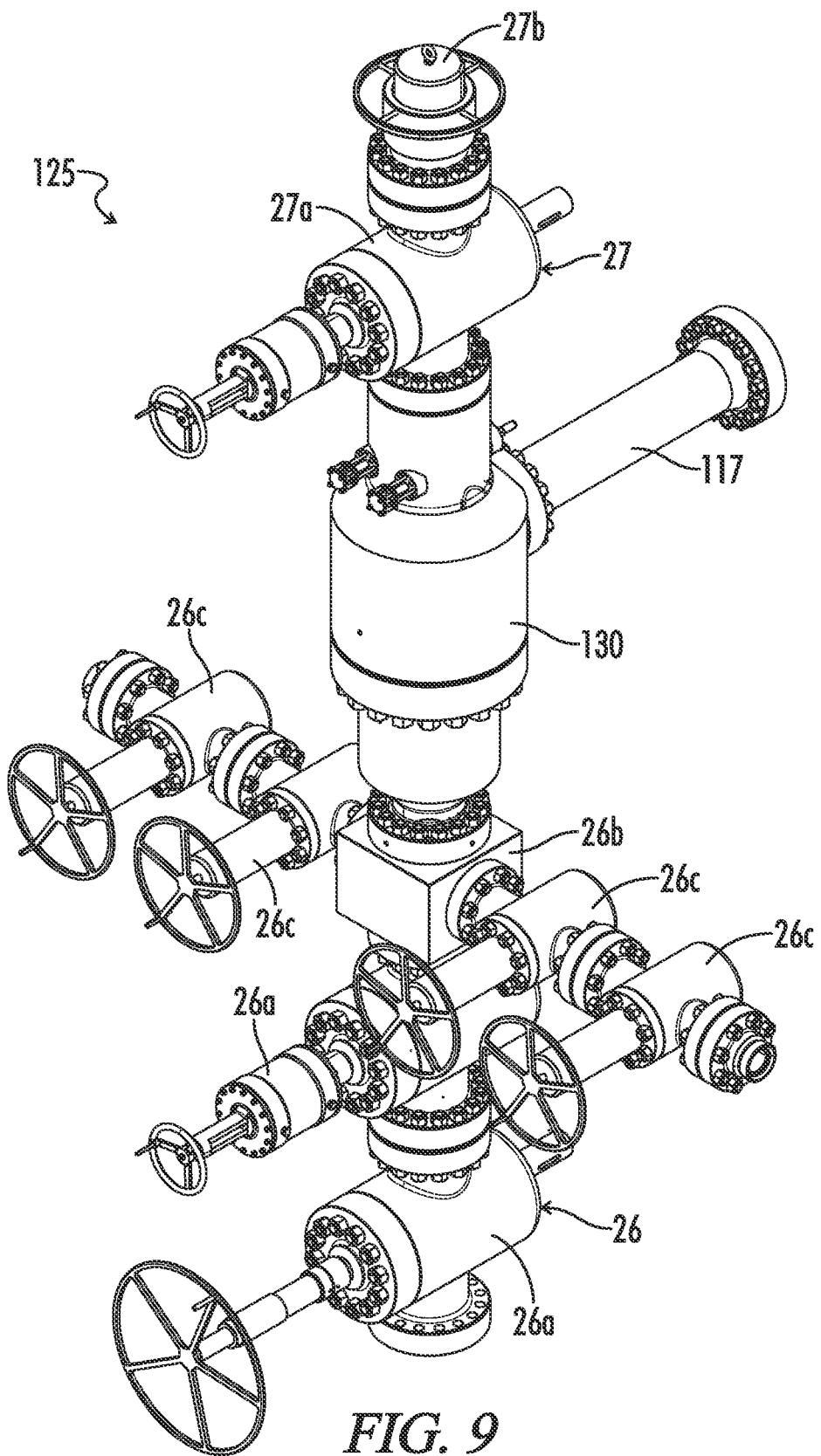
FIG. 9 is an isometric view of a second preferred embodiment 125 of the novel wellhead assemblies of the subject invention comprising a second preferred embodiment 130 of the novel dual path control fittings of the subject invention.
Figure 10:
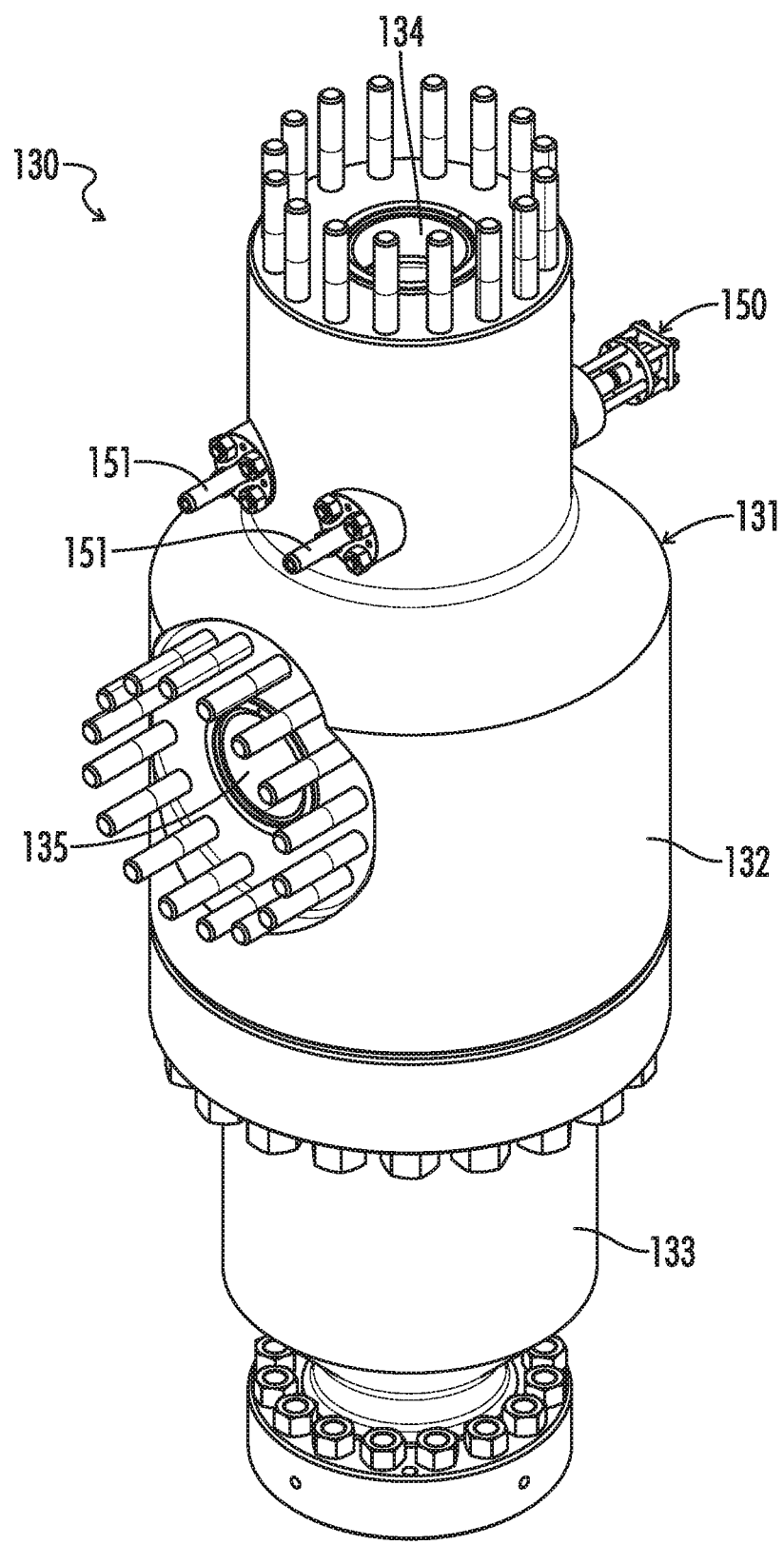
FIG. 10 is an isometric view of fitting 130 shown in FIG. 9.
Figure 11:
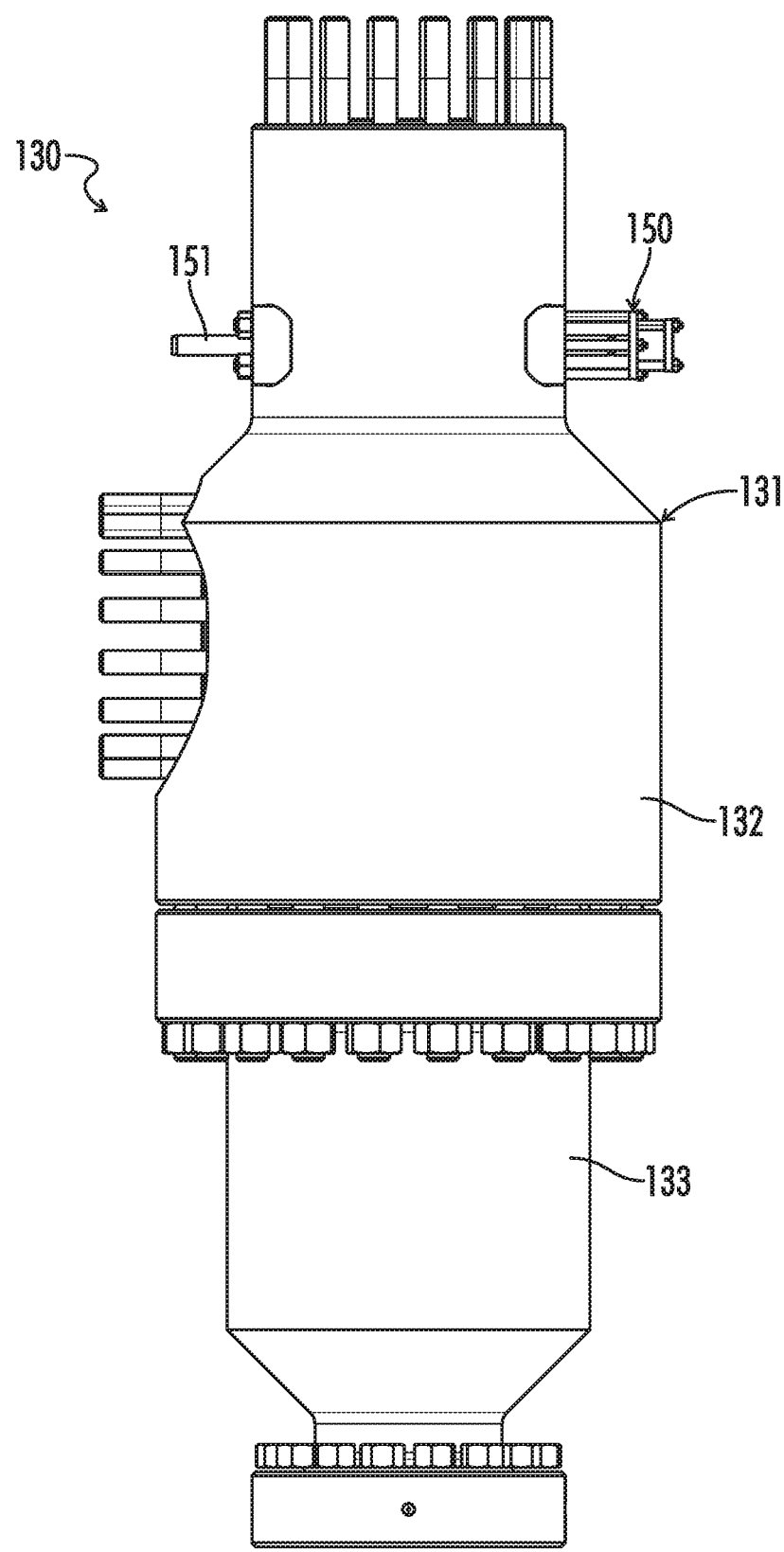
FIG. 11 is an elevational view of fitting 130 shown in FIGS. 9-10.

A second preferred embodiment 125 of the novel wellhead assemblies is shown in FIG. 9. Wellhead assembly 125, like wellhead assembly 25, comprises flow control kit 26 and tool insertion kit 27. Instead of fitting 30, however, wellhead assembly 125 comprises a second preferred embodiment 130 of the novel dual path control fittings. Wellhead assembly 125 may be installed on a wellhead. Fitting 130 is assembled between flow control kit 26 and tool insertion kit 27 and will control flow of frac fluid into wellhead assembly 125 during fracturing operations and allow wireline and other tools to be deployed through wellhead assembly 125 during tool operations. Like wellhead assembly 25, wellhead assembly 125 may include any of the fittings, control fittings, and other components as are used conventionally in wellhead assemblies according to the design and needs of the well and preferences of the operator.

Fitting 130 is shown in greater detail in FIGS. 10-15. As shown therein, fitting 130 generally comprises a fitting body 131, a sleeve assembly 140, and a locking mechanism 150. As described further below, fitting 130 provides two paths, one path allowing frac fluids to flow through fitting 130 and the other allowing tool operations to be conducted through fitting 130. A flow sleeve 141 in sleeve assembly 140 is hydraulically actuated to selectively open and shut the frac path. Locking mechanism 150 is used to lock sleeve 141 in is open and shut positions.

Fitting body 131 provides the base to which the other components are assembled, directly or indirectly, and in large part absorbs the pressure of hydraulic fluids passing through fitting 130. Fitting body 131 preferably comprises a first or upper sub 132 and a second or lower sub 133.

Figure 12:
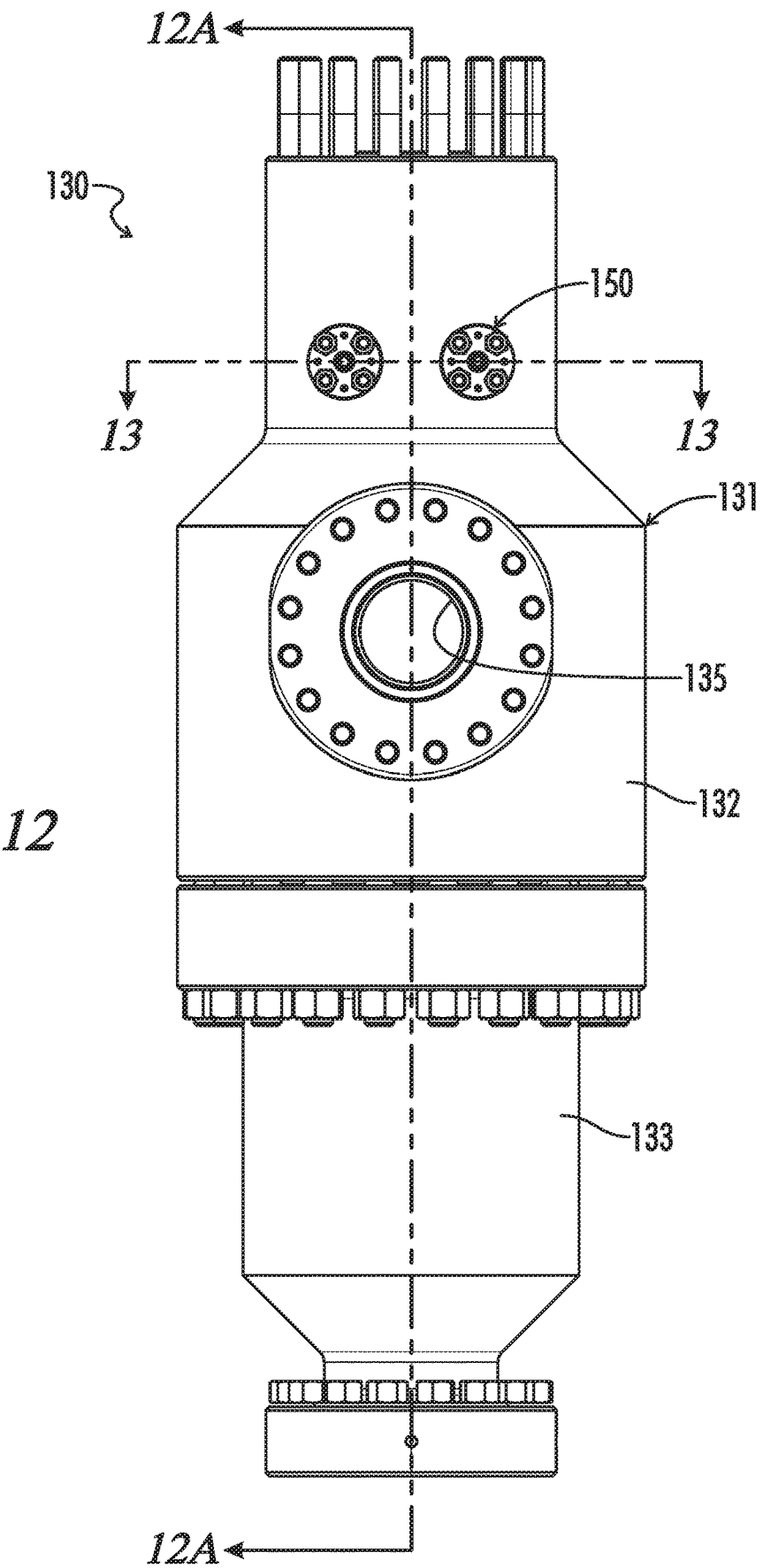
FIG. 12 is another elevation view of fitting 130, taken at a 90° angle to the view of FIG. 11.

As best appreciated from the cross-sectional views of FIG. 12, upper sub 132 and lower sub 133 collectively define a cylindrical bore 134 extending along the primary axis of fitting body 131. Upper sub 132 also defines a cylindrical conduit 135 extending radially inward from a flat on the circumference of upper sub 132 into bore 134. Conduit 135 extends at a right angle into bore 134. If desired, however, conduit may intersect at an angle acute to vertical, or it may be provided with a downward curve, thus encouraging downward flow through fitting 130.

The upper end of bore 134 on upper sub 132 provides a first inlet communicating with tool insertion kit 27. The first inlet allows wireline or other tools to be run into fitting 130. Conduit 135 in upper sub 132 provides a second inlet into which frac fluid may be flowed, for example, from frac line 117. The lower end of bore 134 on lower sub 133 provides an outlet communicating with flow control kit 26 that allows frac fluid and wireline or other tools to pass from fitting 130 into flow control kit 26 and ultimately into the well.

Flange union faces are provided around the mating ends of upper sub 132 and lower sub 133 allowing them to be joined by a flange union. A flange union face also is provided around the first and second inlets on upper sub 132 and around the outlet on lower sub 133 so that fitting 130 may be assembled into wellhead assembly 125, and so that other flowline components, such as frac line 117, may be joined to fitting 130 by flange unions. Upper and lower subs 132 and 133 preferably, as exemplified, are generally cylindrically shaped components, with upper sub 132 having a flat at the opening of conduit 135. Such configurations are well suited for providing flange union faces.

Figure 14:
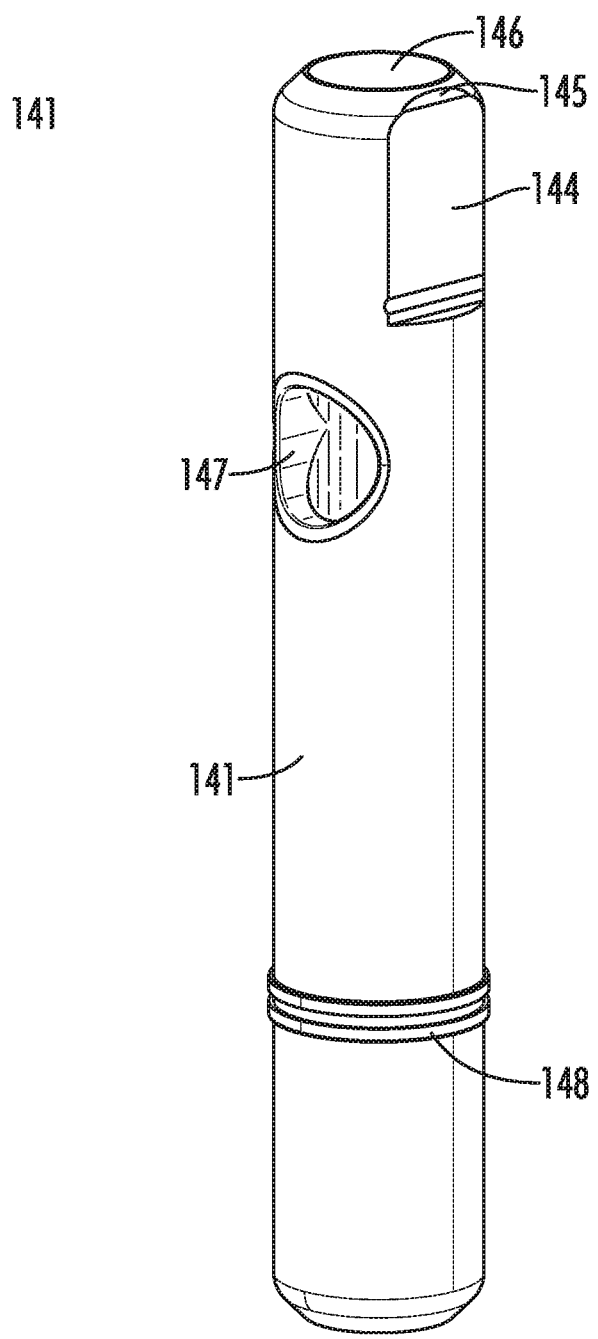
FIG. 14 is an isometric view of a flow sleeve 141 of fitting 130.
Figure 15:
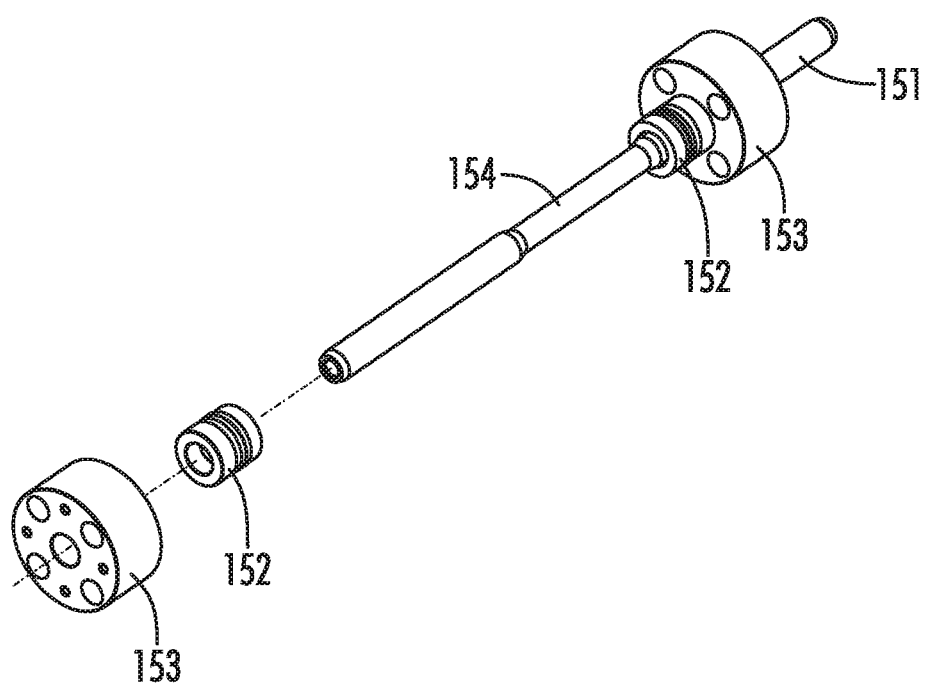
FIG. 15 is an isometric, partially exploded view of locking mechanism 160 of fitting 130.

Sleeve assembly 140, as seen best in the cross-sectional views of FIG. 12 and the isometric view of FIG. 14, comprises a ported flow sleeve 141. Sleeve 141 is a generally open cylinder providing an axially extending conduit 146. A port 147 extends through the wall of sleeve 141. Conduit 146 communicates at its upper end with the first, tool operations inlet on upper sub 132 and at its lower end with the outlet on lower sub 133. Thus, fitting 130 is provided with a first path from the tool operations inlet of upper sub 132, through sleeve conduit 146, and to the outlet on lower sub 133. That first path allows wireline and other tools to be passed along a straight line through fitting 130 from tool insertion kit 27 into flow control kit 26 and ultimately into the well.

Figure 12A:
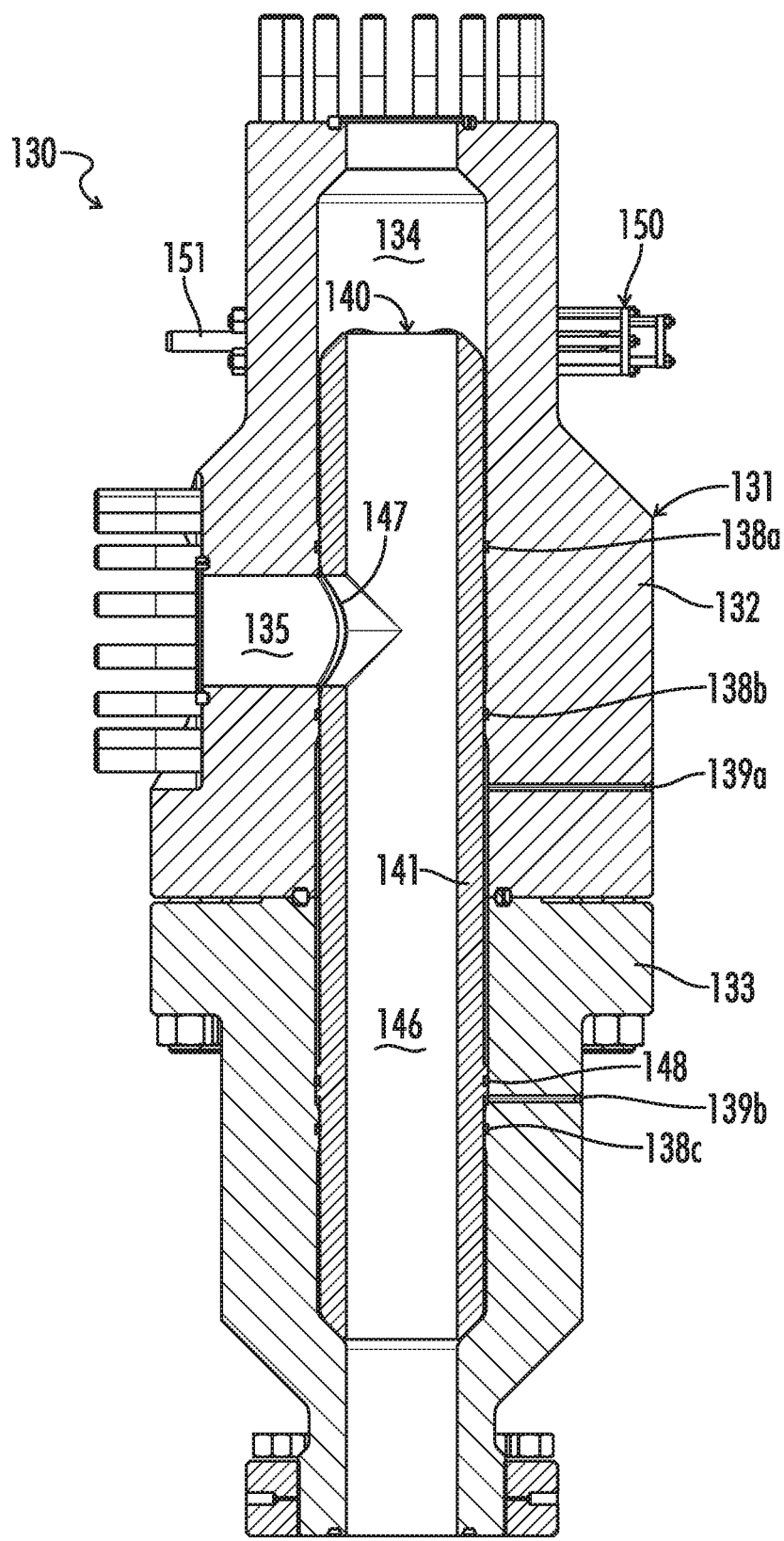
FIG. 12A is an axial cross-sectional view of fitting 130 taken along line 12A-12A of FIG. 12, showing fitting 130 in its fracturing position.
Figure 12B:
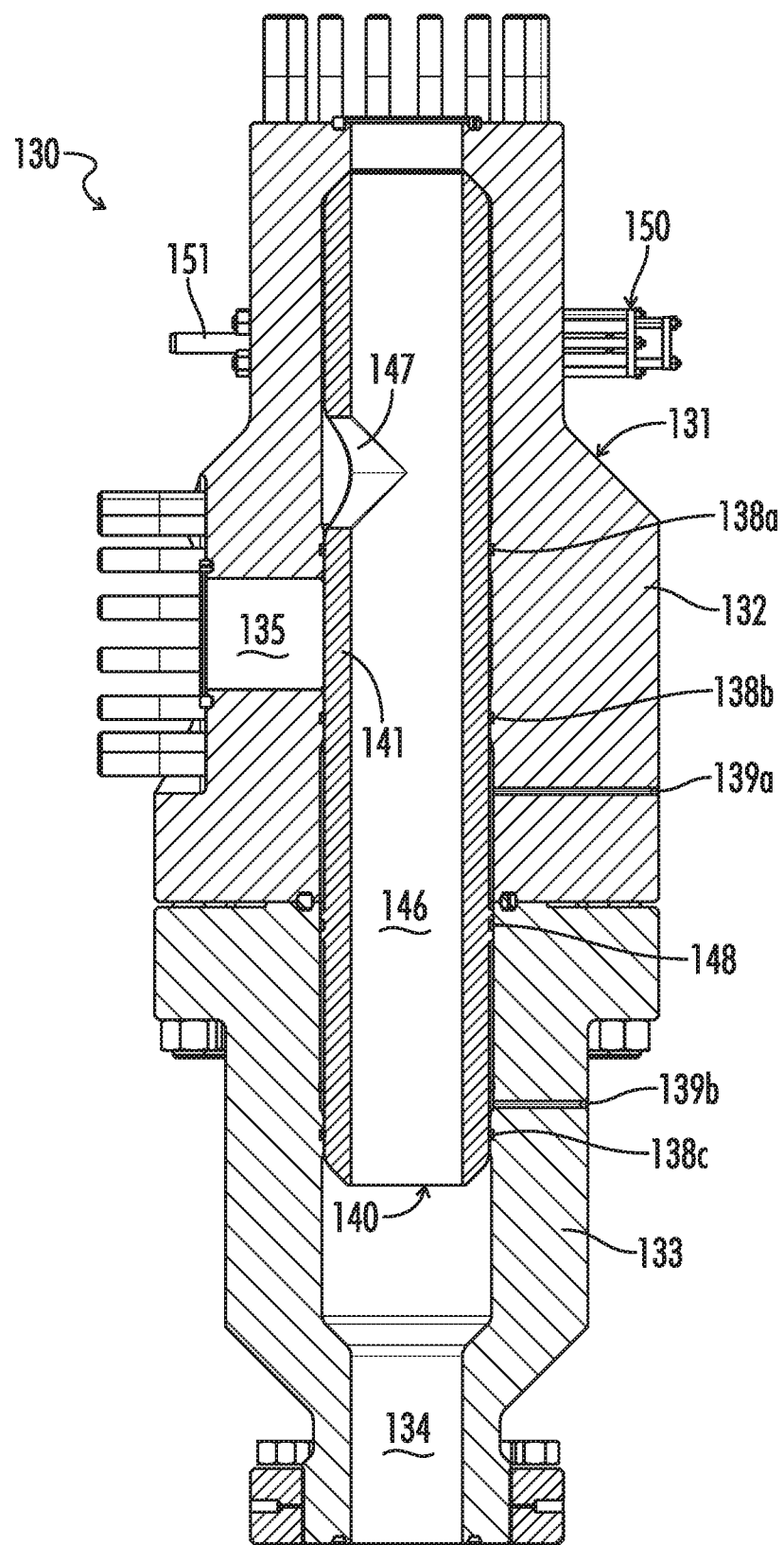
FIG. 12B is an axial cross-sectional view of fitting 130 taken along line 12A-12A of FIG. 12, showing fitting 130 in its tool operations position.

As best appreciated by comparing FIGS. 12A and 12B, sleeve 141 is mounted for axial reciprocation in bore 134 of fitting body 131 between a first or fracturing position (lower) and a second or tool operations position (upper). A small clearance is provided between sleeve 141 and fitting body bore 134. Slight annular bosses 138a and 138b project radially inward from fitting body bore 134 in upper sub 132 above and below fitting body conduit 135. Each boss 138a/138b has an annular gland in which is mounted a seal ring, such as an elastomeric O-ring, to provide a static pressure seal against the outer circumference of sleeve 141 to isolate pressure around conduit 135.

When sleeve 141 is in its fracturing position, as shown in FIG. 12A, port 147 in sleeve 141 is aligned with upper sub conduit 135. Sleeve 141 thus establishes a second path through fitting 130 leading from the frac inlet at the open end of upper sub conduit 135, through sleeve port 147 and the lower portion of sleeve conduit 146, and to the outlet on lower sub 133. With the swab valve in tool insertion kit 27 closed, that second path allows frac fluid to be flowed into fitting 130 and flow control kit 26 and ultimately into the well. When sleeve 141 is in its tool operations position, sleeve port 147 will be shifted out of alignment with upper sub conduit 135, and the frac path will be shut off.

Sleeve 141 is shifted back and forth between its frac and tool operations positions by a hydraulic system. Another slight annular boss 138c projects radially inward from fitting body bore 134 in lower sub 133. Boss 138c also has an annular gland in which is mounted a seal ring, such as an elastomeric O-ring, to provide a static pressure seal against the outer circumference of sleeve 141. The seals on bosses 138b and 138c provide a hydraulic chamber around sleeve 141.

A slight annular boss 148 projects radially outward from the outer circumference of sleeve 141. Boss 148 is situated between bosses 138b and 138c in bore 134 and has a dynamic seal ring, such as an elastomeric O-ring, mounted in an annular gland. The seal divides the hydraulic chamber into upper and lower portions. Hydraulic ports 139a and 139b are provided, respectively, in upper sub 132 and lower sub 133. They communicate, respectively, with the upper and lower portions of the hydraulic chamber. Conventional hydraulic fluid supply and control systems thus may be used to shift sleeve 141, either manually or automatically, between its frac and tool operations positions.

Figure 13:
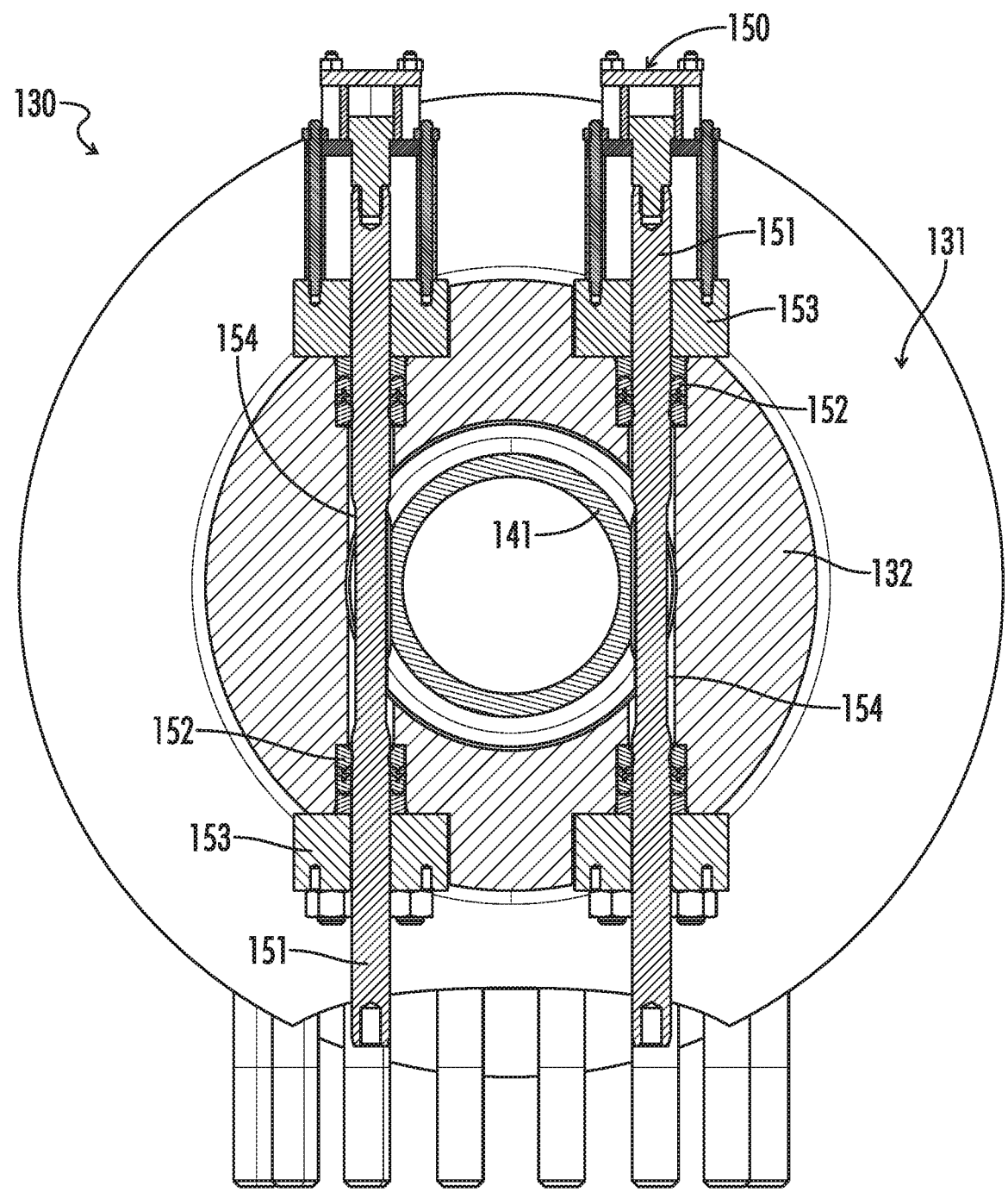
FIG. 13 is a transverse cross-sectional view of fitting 130 taken along line 13-13 of FIG. 12, showing details of its locking mechanism 150.

Locking mechanism 150 can selectively lock sleeve 141 in either its lower, frac position or its upper, tool operations position. As may be seen in FIG. 10, locking mechanism 150 comprises a pair of lock rods 151. Lock rods 151, as shown in FIG. 13, extend transversely across upper sub 132 and bore 134 on opposite sides of sleeve 141. They are mounted for reciprocation through openings in upper sub 132. The openings provide glands in which are mounted packings 152. Packings 152 are retained by packing spacers 153 that are attached to upper sub 132 by, for example, threaded connectors. Packings 152 isolate pressure within fitting 130 and may be of the same type as uni-directional packings 42 in fitting 30.

Lock rods 151 and the upper end of sleeve 141 are profiled to allow reciprocation of sleeve 141 on the one hand and, on the other, locking of sleeve 141 in either its lower, frac position or its upper, tool operations position. More particularly, as seen best in FIG. 15, lock rods 151 are generally cylindrical, but their mid-section 154 has a reduced diameter. The upper end of sleeve 141, as seen best in FIG. 14, is provided with flats 144 on its outer circumference. A transverse groove 145 is provided at both the upper and lower extent of flats 144.

When lock rods 151 are in their unlock position, their reduced diameter portions extend across and just outside of flats 144 of sleeve 141, providing clearance between lock rods 151 and sleeve 141. Sleeve 141 is free to move between its frac and tool operations positions. When sleeve 141 is in a lower, frac position, lock rods 151 may be shifted to their lock position in which they engage grooves 145 at the upper extent of flats 144 on sleeve 141. Sleeve 141 thus is locked in its frac position. Similarly, sleeve 141 may be locked in its tool operations position by shifting lock rods 151 into engagement with grooves 145 at the lower extent of sleeve flats 144.

Lock rods 151 may be reciprocated manually, or may be provided with electro-mechanical, hydraulic, or other linear actuators that may be actuated manually or with conventional control systems. While locking mechanism 150 provides simple, reliable locking of sleeve 141, other conventional locking systems may be used. Pins, for example, may be shifted into and out of openings or other profiles in sleeve 141.

Like fitting 30, fitting 130 provides two separate paths, thus eliminating the need for a separate valve to control flow and access through a tee or other junction fitting in conventional wellhead assemblies. Fitting 130 also provides that functionality without many of the problems attendant to gate valves. Sleeve 141 in fitting 130 may be moved quickly and easily between its frac and tool operations position. Fitting 130 also does not require grease, is far less prone to seizing, and lacks areas where sand can build up and interfere with operation of sleeve 141.

Figure 16:
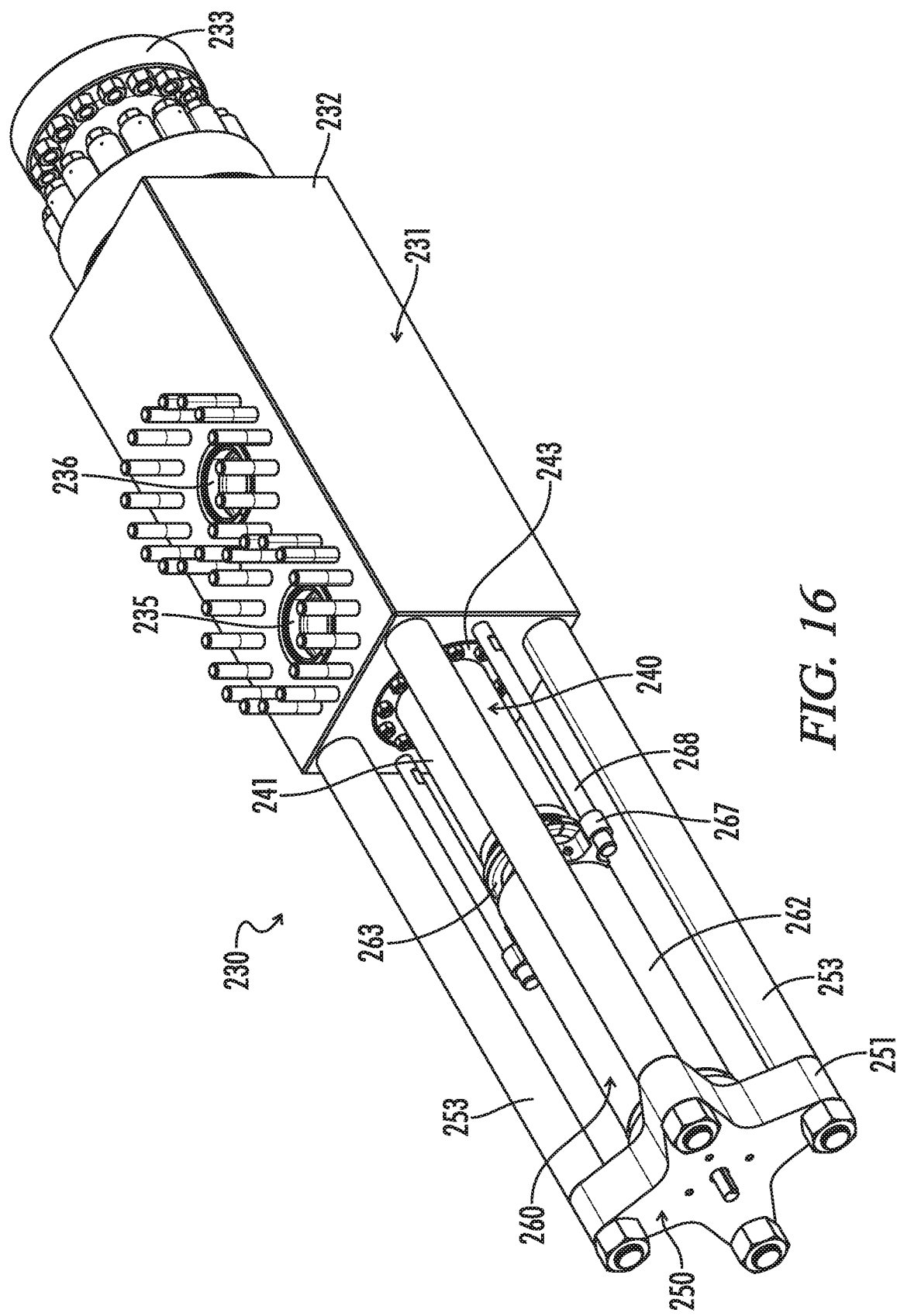
FIG. 16 is an isometric view of a third preferred embodiment 230 of the novel dual path control fittings of the subject invention, which fitting 230 is a shuttle valve.

A third preferred embodiment 230 of the novel dual path control fittings is shown in FIGS. 16-17. Fitting 230 is a shuttle valve and may be assembled into a zipper manifold, such as zipper manifold 116 shown in FIG. 2. As described further below, it may be used during fracturing operations to selectively divert flow into a pair of frac lines, such as frac lines 117.

As best appreciated from the cross-sectional views of FIG. 17, shuttle valve 230 generally comprises a fitting body 231, a plunger assembly 240, a frame 250, and a drive mechanism 260. As described further below, a ported plunger 241 in plunger assembly 240 will be actuated through drive mechanism 260 to selectively open one of two flow paths through shuttle valve 230, thus selectively diverting flow, for example, into one of two frac lines 117 (not shown).

Frame 250 and drive mechanism 260 share substantially identical designs with, respectively, frame 50 and drive mechanism 60 of fitting 30. As with fitting 30, shuttle valve 230 may have other frames and drive mechanisms. Instead of drive mechanism 260, for example, shuttle valve 230 may incorporate other types of linear actuators. Since shuttle valve 230 is more likely to be installed at ground level where it is more accessible, driver 261 also may be hand driven, for example, through a wheel crank.

Fitting body 231 is similar to fitting body 31 of fitting 30. It provides the base to which the other components are assembled, directly or indirectly, and in large part absorbs the pressure of hydraulic fluids passing through fitting 230. Fitting body 231 preferably comprises a first sub or fitting block 232 and a second sub or bonnet 233

As best appreciated from the cross-sectional views of FIG. 17, fitting block 232 and bonnet 233 collectively define a cylindrical bore 234 extending axially through fitting to body 231. One end (right) of bore 234 provides an inlet into which frac fluid may be flowed. The other end (left) of bore 234 provides an opening through which plunger assembly 240 extends.

Fitting block 232 defines a first cylindrical conduit 235 and a second cylindrical conduit 236. Both conduits 235 and 236 extend radially inward from the top of fitting block 232 into bore 234. Preferably, they are offset along the primary axis of bore 234. As will be appreciated from the discussion that follows, first conduit 235 provides a first outlet communicating with, for example, a first frac line 117 (not shown) leading to wellhead assembly 8 of a first well. Second conduit 236 provides a second outlet communicating with, for example, a second frac line 117 (not shown) leading to wellhead assembly 8 of a second well.

Flange union faces are provided around the mating ends of fitting block 232 and bonnet 233 allowing fitting block 232 and bonnet 233 to be joined by a flange union. Flange union faces also are provided around the inlet on bonnet 233 and around the first and second outlets on fitting block 232 so that fitting 230 may be assembled into a frac system by flange unions. Fitting block 232 preferably, as exemplified, is a solid rectangularly shaped component, while bonnet 233 is a generally tubular-shaped component having flanges at each end.

Plunger assembly 240, as seen best in the cross-sectional views of FIG. 17, generally comprises ported plunger 241, uni-directional packings 242, a packing spacer 243, a bi-directional packing 244, and packing sleeves 245. Plunger 241 is generally cylindrical, one end (left) being solid and the other end (right) being open. It is mounted for reciprocation in the portion of bore 234 that extends through fitting block 232. Plunger 241 is provided with a conduit 246.

Conduit 246 is substantially identical to frac conduit 46 in plunger 41 of fitting 30. It initially extends axially from the open end of plunger 241 and then turns downward toward a port on the circumference of plunger 241. Preferably, as exemplified, the port is normal to the primary axis of plunger 241, and conduit 246 makes a sweeping 90° turn toward the port. Plunger conduit 246, however, may be formed from intersecting straight-line bores. Since the port is normal to the axial portion of plunger conduit 246 it will align exactly with fitting body conduits 235 and 236, all having the same diameter.

Figure 17A:
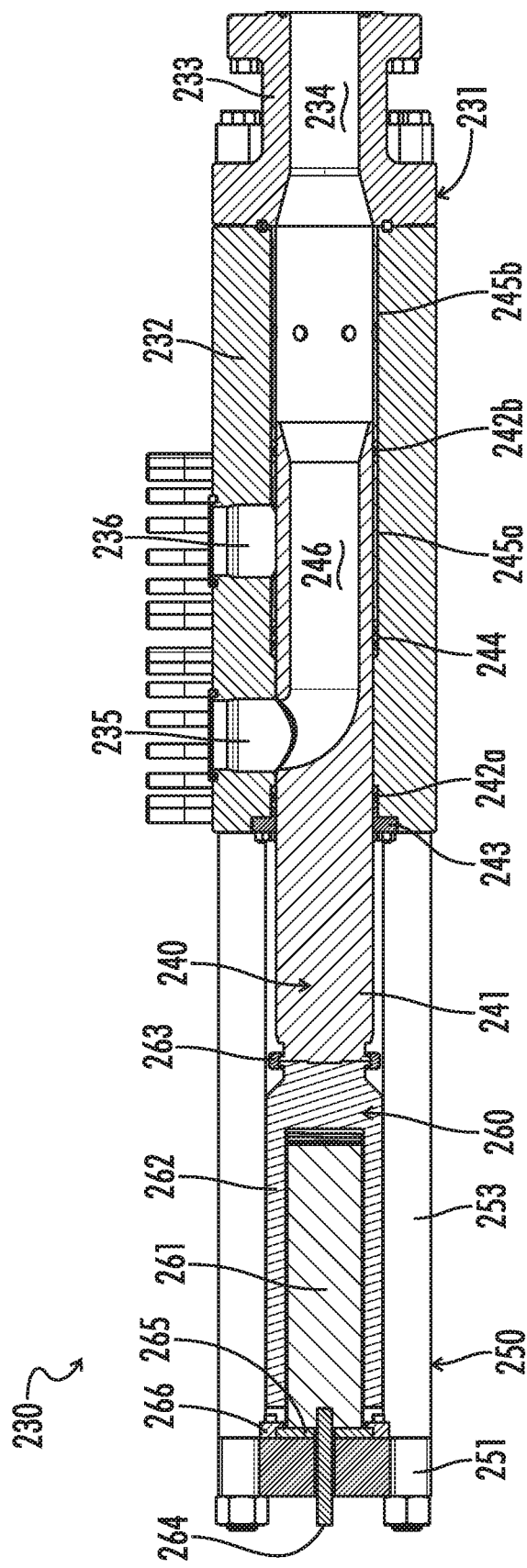
FIG. 17A is a cross-sectional view of shuttle valve 230 shown in FIG. 16, showing shuttle valve 230 in a first position in which a plunger 241 is in a retracted position.
Figure 17B:
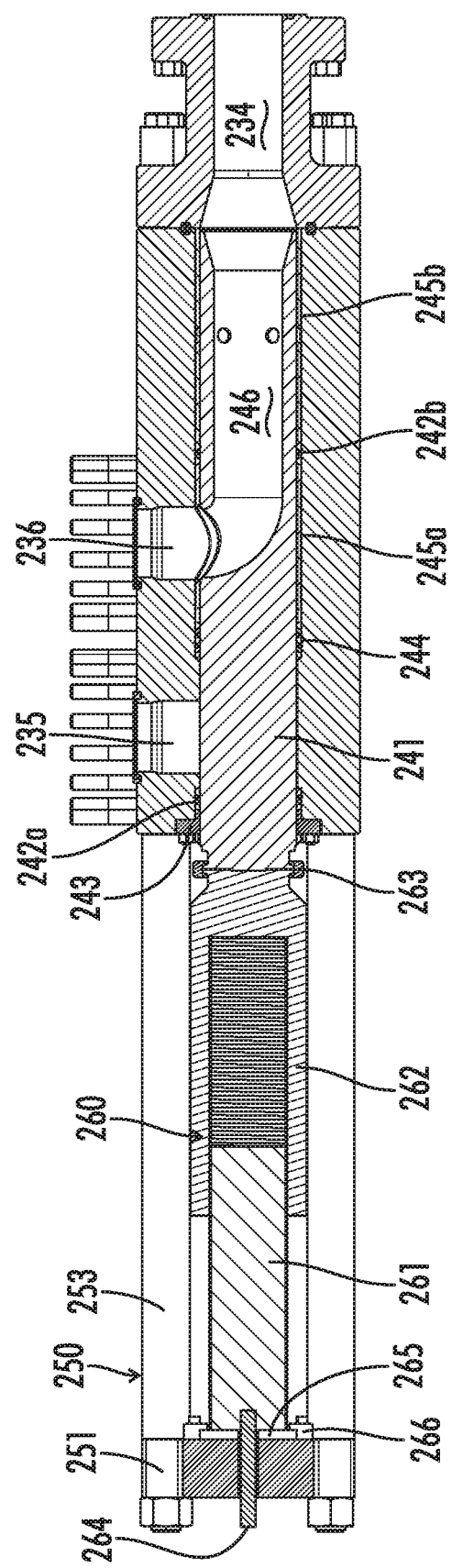
FIG. 17B is a cross-sectional view of shuttle valve 230 in FIG. 16, showing shuttle valve 230 in a second position in which plunger 241 is in an inserted position.

As best appreciated by comparing FIGS. 17A and 17B, plunger 241 is mounted for reciprocation between a first position (leftward) and a second position (rightward). When plunger 241 is in its first position, as shown in FIG. 17A, the port of plunger conduit 246 is aligned with first fitting body conduit 235. Plunger 241 thus establishes a first flow path through fitting 230 leading from the frac inlet at the open end of bore 234 in bonnet 233, through conduit 246 of plunger 241, and to the outlet of first fitting body conduit 235. That first flow path allows frac fluid to be flowed into fitting 230 and thence into a first frac iron component, for example, a first frac line 117 (not shown).

When plunger 241 is in its second position, as shown in FIG. 17B, the port of plunger conduit 246 is aligned with second fitting body conduit 236. Plunger 241 thus establishes a second flow path through fitting 230 leading from the frac inlet at the open end of bore 234 in bonnet 233, through conduit 246 of plunger 241, and to the outlet of second fitting body conduit 236. That second flow path allows frac fluid to be flowed into fitting 230 and thence into a second frac iron component, for example, a second frac line 117 (not shown).

Packings 242 and 244 are provided to seal the clearance between plunger 241 and fitting block 232. Preferably, as shown they are mounted in annular glands in bore 234. They may be any conventional annular packings of the same type as packings 42 and 44 in fitting 30.

Uni-directional packing 242a is positioned axially between one (the left) end of fitting block 232 and first fitting body conduit 235. It is designed to hold pressure on its right side as may be generated during fracturing operations, for example, when fluid is flowed through plunger conduit 246 along the first flow path. Bi-directional packing 244 is positioned axially between first and second fitting body conduits 235 and 236. It is designed to hold pressure on both of its sides, as one side or the other of packing 244 will be exposed to pressure during fracturing operations when fluid is flowed through plunger conduit 246 regardless of which flow path is selected. Uni-directional packing 242b is positioned axially between the second fitting body conduit 236 and the other (right) end of fitting block 232. It is designed hold pressure on its left side as may be generated during fracturing operations, for example, when fluid is flowed through plunger conduit 246 along the second flow path.

Uni-directional packing 242a is held in its gland by an annular packing spacer 243 similar to packing spacer 43 in fitting 30. Bi-directional packing 244 and uni-directional packing 242b are held in place by packing sleeves 245a and 245b. Packings sleeves 245 are similar to packing sleeve 45 in fitting 30. Packing sleeve 245a is interposed between bi-directional packings 244 and uni-directional packing 242b, and packing sleeve 245b bears on uni-directional packing 242b from the inlet end (right) of bore 234. They are secured by bonnet 233 which, when joined to fitting body 232, will bear on packing sleeve 242b.

It will be appreciated that the novel shuttle valves can provide significant advantages in otherwise conventional frac systems. In conventional frac systems, such as the system illustrated in FIG. 2, junction head 115 of zipper manifold 116 is provided by a tee fitting. The tee fitting receives frac fluid from flow line 114 and distributes it to frac lines 117. Frac lines 117 each have a valve 118.

Embodiments of the novel shuttle valves, however, eliminate the need for the tee fitting and separate valves to control flow through the frac lines. Shuttle valve 230, for example, may be assembled as a junction head in zipper manifold 116 replacing the tee fitting. Shuttle valve 230 will provide two separate flow paths—one for each frac line 117. Shuttle valve 230 also will selectively distribute flow to frac lines 117, thus eliminating the need for valves 118 or providing redundancy to valves 118.

It also will be appreciated, that if desired, fitting block 232 may be provided with additional, axially offset cylindrical conduits extending radially inward into bore 234 similar to fitting body conduits 235 and 236. The additional radial conduits can provide additional outlets allowing plunger 241 to establish additional flow paths through fitting body 231 communicating with additional frac lines or other frac iron components. For example, four fitting body conduits may be provided in the fitting block. Additional packings may be provided, and the fitting body and plunger dimensioned accordingly so that the novel shuttle valve may distribute fluid to four frac lines.

The valves in conventional zipper manifolds, such as valves 118, also typically are gate valves. Embodiments of the novel shuttle valves can provide that functionality without many of the problems attendant to gate valves. For example, packings 242 and 244 require minimal grease, yet plunger 241 is far less prone to seizing. Maintenance is to simplified, and issues created by grease being blown into the well are minimized. Fitting 230 also lacks areas where sand can build up and interfere with operation of plunger 241.

As discussed above, fitting bodies 31/131/231 of the illustrated embodiments are provided with flange union faces allowing them to be joined to other frac iron components by flange unions. Frac systems are required at a site for a relatively short period of time, and unions allow the components to be connected ("made up") and disconnected ("broken down") relatively quickly. Though spoken of in terms that may imply they are discreet components, unions are actually interconnected subassemblies of the components joined by the union. One sub will be on one component, and a mating sub will be on the other. The subs then will be connected to each other to provide the union.

Flange unions are one common union design, and they may be made up and broken down with relative ease. They also provide a robust and reliable union and have been adapted for low pressure (1,000 to 2,000 psi), medium pressure (2,000 to 4,000 psi), and high pressure service (6,000 to 20,000 psi).

As their name implies, flange unions classically provide a connection between two flanged flowline components, such as spooled pipe. Annular flanges extend radially outward from each mating end of the components. The flanges have mating bearing surfaces or faces. Each face will have an annular groove running concentrically around the conduit opening. An annular metal seal is carried in the grooves to provide a seal between the flanges.

The flanges also are provided with a number of holes that accommodate threaded connectors. The holes are arranged angularly around the flange. Thus, the components may be connected by bolting the flanges together. The bolts draw the union faces together and apply an axial load across them. More or fewer holes and bolts may be provided depending upon the size of the union between the components and the pressures for which the union will be rated. Also, and though described as "flat" herein, the groove in the flange face typically will be formed in a very slight annular boss. The annular boss will help ensure that the abutment between mating union faces is properly loaded when the union is made up.

The designs and features of union faces in particular and flange unions in general are well known and do not necessarily incorporate a flange. Similarly, through holes and standard nuts and bolts are not essential. Flange union faces, for example, are provided on the faces of fitting body 31 of fitting 30. It is provided with bottomed holes that may be threaded to accept standing bolts (not shown) or adapted to receive threaded studs (not shown). As used herein, a "flange union face" shall refer to a flat bearing surface, preferably having an annular metal seal, that may be loaded axially against another flange union face with threaded connectors to provide a union between two components. A "flange union" shall refer to a connection between two components that is formed by a flange union face.

Though exemplified as having flange union faces that allow them to be assembled to other flowline components with flange unions, the novel components may be joined to other flowline components by other conventional means. For example, instead of flange union faces, they may be provided with other subs allowing them to be joined by hammer (or "Weco®") unions or clamp (or "Greyloc®") unions, two other union designs commonly used in frac systems. They also may be provided with threaded connections.

When the novel components, such as fittings 30/130/230, are assembled into a frac system they preferably will be rated for high pressures, that is, rated pressures of at least about 6,000 psi. Some frac jobs may require ratings as high as 15,000 or 20,000 psi. Such higher-pressure ratings often are preferred, as they will allow a component to be used in a range of fracturing operations operating a higher and lower frac pressures. The novel components, however, may be rated for low pressure service (from about 1,000 to about 2,000 psi) or for medium pressure service (from about 2,000 to about 6,000 psi) and used in lower pressure systems.

The fittings of the subject invention may be manufactured by methods and from materials commonly used in manufacturing flow iron components. Given the extreme stress, the cyclic vibrations, the corrosive and abrasive fluids, and the high-pressure, high-velocity flow to which frac systems and the like are exposed, suitable materials will be hard and strong. For example, the components of the novel fittings, excepting elastomeric seals, packings, and the like, may be manufactured from 4130 and 4140 chromoly steel or from somewhat harder, stronger steel such as 4130M7, high end nickel alloys, and stainless steel. The parts may be made may be made by any number of conventional techniques, but typically and in large part will be made by forging, extruding, or mold casting a blank part and then machining the required features into the part.

Although exemplified in the context of systems for fracturing wells, the novel fittings may be used in other fluid transportation systems and in other operations, especially those that will transport abrasive or corrosive fluids under pressure. They also may be used in other well operations employing other well treatment fluids. For example, aqueous acids such as hydrochloric acid may be injected into a formation to clean up a formation. Water or other fluids may be injected into a formation from a "stimulation" well to drive hydrocarbons toward a production well. In many such stimulation processes, as in fracturing a well, the ability to selectively flow treatment fluids into the well may be desirable.

Certain preferred embodiments also have been described as useful in allowing wireline operations to be conducted through them. Such embodiments also may be configured and used in slickline operations, coiled tubing operations, ball drop, or other operations where it may be preferable to provide straight-line access through a wellhead assembly.

References have been made to "casings" and "liners." Those terms, however, can have a fairly specific meaning within the industry. In its narrow sense, a "casing" is generally considered to be a relatively large tubular conduit, usually greater than 4.5" in diameter, that extends into a well from the surface. A "liner" is generally considered to be a relatively large tubular conduit that does not extend from the surface of the well, and instead is supported within an existing casing or another liner. It is, in essence, a "casing" that does not extend from the surface. As used herein, the terms are synonymous unless the context clearly indicates otherwise.

It also will be appreciated that terms such as "axial," "radial," "lateral," "transverse," and forms thereof reference the primary axis of the fitting or the referenced feature. For example, axial movement or position refers to movement or position generally along or parallel to the central axis running through the length of fitting 30. "Radial" refers to positions or movement toward or away from the primary axis. "Lateral" and "transverse" movement or positions refer, respectively, to movement or position generally along or across the fitting. Also, the "circumference" of a generally cylindrically shaped component will refer to its face, as opposed to its ends. Terms such as "upper," "lower," "right,", "left," and the like refer to the orientation in which the fittings are shown in the drawings. The fittings, however, may be installed and used in various orientations.

Similarly, terms such as "inlet," and "outlet" have been used to describe the functions of those openings relative to each other in the context of the exemplified installations. It will be readily appreciated that in other installations, flow through the fittings may be reversed, "inlets" may be "outlets" and vice versa. Fitting 30, for example, may be assembled into a wellhead assembly and used to control flowback from a well while allowing tool operations to be conducted through it. Shuttle valve 230 also might be used to receive flow selectively from a pair of supply lines. Descriptors such as "frac" and "tool operations" conduit also have been used for convenience in the context of the exemplified installations. As noted, the novel fittings may be used in systems other than frac systems and used to conduct operations other than tool operations.

While this invention has been disclosed and discussed primarily in terms of specific embodiments thereof, it is not intended to be limited thereto. Other modifications and embodiments will be apparent to the worker in the art.

What is claimed is:

1. A dual path control fitting for a system for fracturing a well, said fitting comprising:
   (a) a fitting body, said fitting body having:
      i) a cylindrical bore extending axially through said fitting body and providing a first inlet at one end thereof and an opening at the other end thereof;
      ii) a first conduit extending radially through said fitting body into said bore and providing a second inlet; and
      iii) a second conduit extending radially through said fitting body into said bore and providing an outlet;
      iv) wherein said first and second fitting body conduits are aligned along a common axis;
   (b) a cylindrical plunger mounted for reciprocation in said bore, said plunger having:
      i) a first conduit extending from one end of said plunger to a port on the circumference of said plunger; and
      ii) a second conduit extending transversely across said plunger;
   (c) wherein said plunger is adapted to reciprocate between:
      i) a first position in which said port is aligned with said second fitting body conduit to provide a first path through said fitting body from said first inlet to said fluid outlet; and
      ii) a second position in which said plunger second conduit is aligned with said fitting body first and second conduits to provide a second path through said fitting body from said second inlet to said fluid outlet; and
   (d) wherein said first path is shut when said plunger is in said second position and said second path is shut when said plunger is in said first position.

2. The fitting of claim 1, wherein said plunger first conduit has a sweeping 90° curve leading to said port.

3. The fitting of claim 1, wherein said plunger second conduit is normal to the primary axis of said plunger.

4. The fitting of claim 1, wherein said second conduit is isolated from said first conduit.

5. The fitting of claim 1, wherein said first and second fitting body conduits are aligned on a common axis.

6. The fitting of claim 1, wherein said fitting comprises a linear actuator operably coupled to said plunger and adapted to reciprocate said plunger between said first and second positions.

7. The fitting of claim 6, wherein said linear actuator is a threaded drive mechanism.

8. The fitting of claim 7, wherein said threaded drive mechanism comprises a rotatable threaded driver and a linearly translating traveler.

9. The fitting of claim 8, wherein said threaded drive mechanism comprises guide rods coupled to said traveler.

10. The fitting of claim 1, wherein said fitting body comprises:
    (a) a first sub defining a first portion of said bore including said bore opening and defining said first and second fitting body conduits; and
    (b) a second sub joined to said first sub and defining a second portion of said bore including said first inlet.

11. The fitting of claim 10, wherein said fitting comprises a frame assembled to said first sub and said linear actuator is mounted within said frame.

12. The fitting of claim 11, wherein said frame comprises:
    (a) an end plate; and
    (b) a plurality of elongated frame members extending between said first sub and said end plate.

13. The fitting of claim 1, wherein said fitting comprises a bi-directional annular packing and a uni-directional packing mounted in said bore, wherein
    (a) said bi-directional packing is positioned axially between said first and second fitting body conduits and said first inlet; and
    (b) said uni-directional annular packing is positioned axially between said first and second fitting body conduits and said bore opening.

14. The fitting of claim 1, wherein said fitting body has a flange union face at each of said first and second inlets and said outlet, said flange union faces adapted to allow a flowline component to be joined to said fitting at said inlets and said outlet by a flange union.

15. The fitting of claim 1, wherein said fitting is rated for high pressure service.

16. A wellhead assembly comprising the fitting of claim 1.

17. A method of servicing a well, said method comprising:
    (a) providing a wellhead assembly of claim 16;
    (b) setting said fitting plunger in its first said position to establish said first path through said fitting body;
    (c) flowing fluids through said fitting along said first path into said well;
    (d) setting said fitting plunger in its second said position to establish said second path through said fitting body; and
    (e) running tools through said fitting along said second path into said well.

18. The method of claim 17, wherein said servicing of said well is a fracturing operation, said fluids are frac fluids, and said tools are wireline tools for plugging and perforating a liner in said well.

19. The wellhead assembly of claim 16, wherein said first path provides a path for flow of fluids and said second path provides a path for passage of tools.

20. The wellhead assembly of claim 19, wherein said wellhead assembly is assembled on a wellhead and said second path is aligned on the primary axis of the wellhead and wellhead assembly.

21. The fitting of claim 1, wherein said port is normal to the axis of said plunger.

22. A dual flow path control fitting for a system for fracturing a well, said fitting comprising:
    (a) a fitting body, said fitting body defining:
       i) a cylindrical bore extending axially through said fitting body and providing a first inlet at one end thereof and an outlet at the other end thereof;
       ii) a conduit extending radially through said fitting body into said bore and providing a second inlet;
    (b) a cylindrical sleeve mounted for reciprocation in said bore, said sleeve having:
       i) a conduit extending axially through said sleeve, said conduit communicating with said first inlet and said outlet to provide a first path through said fitting body from said first inlet to said outlet; and
       ii) a port on the circumference of said sleeve;
    (c) wherein said sleeve is adapted to reciprocate between:
       i) a first position in which said port is aligned with said fitting body conduit to provide a second path through said fitting body from said second inlet to said outlet; and ii) a second position in which said port is not aligned with said fitting body conduit and said second path is shut.

23. The fitting of claim 22, wherein said sleeve is hydraulically actuated.

24. The fitting of claim 23, wherein said fitting comprises:
(a) seals defining first and second hydraulic chambers in clearance between said sleeve and said bore; and
(b) first and second hydraulic passages extending through said fitting body and communicating with, respectively, said first and second hydraulic chambers.

25. The fitting of claim 22, wherein said fitting body comprises:
(a) a first sub defining:
   i) a first portion of said bore including said first inlet; and
   ii) said first and second inlets; and
(b) a second sub joined to said first sub and defining a second portion of said bore including said fluid outlet.

26. The fitting of claim 22, wherein said fitting comprises a lock mechanism adapted to selectively hold said sleeve in its said first and second positions.

27. The fitting of claim 22, wherein:
(a) said sleeve comprises:
   i) a flat on its outer circumference; and
   ii) first and second grooves at, respectively, the upper and lower extent of said flat; and
(b) said fitting comprises a profiled rod mounted for reciprocation transversely across said flat, said profiled rod having a radially reduced portion and a radially enlarged portion;
(c) wherein said profiled rod is adapted to reciprocate between:
   i) an unlock position in which said radially reduced portion extends across said sleeve flat allowing said sleeve to move under said rod between its said first and second position; and
   ii) a locked position in which said radially enlarged portion selectively engages said sleeve first groove and said sleeve second groove when, respectively, said sleeve is in its said first position and its said second position.

28. The fitting of claim 22, wherein said fitting body has a flange union face at each of said first and second inlets and said outlet, said flange union faces adapted to allow a flowline component to be joined to said fitting at said inlets and said outlet by a flange union.

29. The fitting of claim 22, wherein said fitting is rated for high pressure service.

30. A wellhead assembly comprising the fitting of claim 22.

31. The wellhead assembly of claim 30, wherein said first path provides a path for passage of tools and said second path provides a path for flow of fluids.

32. The wellhead assembly of claim 31, wherein said wellhead assembly is assembled on a wellhead and first path is aligned on the primary axis of the wellhead and wellhead assembly.

33. A method of servicing a well, said method comprising:
(a) providing a wellhead assembly of claim 30;
(b) setting said fitting sleeve in its first said position to establish said first path through said fitting body;
(c) running tools through said fitting along said first path into said well;
(d) setting said fitting sleeve in its second said position to establish said second path through said fitting body; and
(e) flowing fluids through said fitting along said second path into said well.

34. The method of claim 33, wherein said servicing of said well is a fracturing operation, said fluids are frac fluids, and said tools are wireline tools for plugging and perforating a liner in said well.

35. A shuttle valve for a system for fracturing a well, said fitting comprising:
(a) a fitting body, said fitting body defining:
   i) a cylindrical bore extending axially through said fitting body and providing a fluid inlet at one end thereof and an opening at the other end thereof;
   ii) a first conduit extending radially through said fitting body into said bore and providing a first fluid outlet; and
   iii) a second conduit extending radially through said fitting body into said bore and providing a second fluid outlet;
   iv) wherein said first and second fitting body conduits are axially spaced along said bore;
(b) a cylindrical plunger mounted for reciprocation in said bore, said plunger having a conduit extending from one end of said plunger to a port on the circumference of said plunger;
(c) wherein said plunger is adapted to reciprocate between:
   i) a first position in which said port is aligned with said first fitting body conduit to provide a first flow path from said fluid inlet to said first fluid outlet; and
   ii) a second position in which said port is aligned with said second fitting body conduit to provide a second flow path from said fluid inlet to said second fluid outlet; and
(d) wherein said first flow path is shut when said plunger is in said second position and said second flow path is shut when said plunger is in said first position.

36. The shuttle valve of claim 35, wherein said port is normal to the axis of said plunger.

37. The shuttle valve of claim 35, wherein said plunger conduit has a sweeping 90° curve leading to said port.

38. The shuttle valve of claim 35, wherein said shuttle valve comprises a linear actuator operably coupled to said plunger and adapted to reciprocate said plunger between said first and second positions.

39. The shuttle valve of claim 38, wherein said linear actuator is a threaded drive mechanism.

40. The shuttle valve of claim 39, wherein said threaded drive mechanism comprises a rotatable threaded driver and a linear translating traveler.

41. The shuttle valve of claim 40, wherein said threaded drive mechanism comprises guide rods coupled to said traveler.

42. The shuttle valve of claim 35, wherein said fitting body comprises:
(a) a first sub defining:
   i) a first portion of said bore including said bore opening; and
   ii) said first and second fitting body conduits; and
(b) a second sub joined to said first sub and defining a second portion of said bore including said fluid inlet.

43. The shuttle valve of claim 42, wherein said shuttle valve comprises a frame assembled to said first sub and said linear actuator is mounted within said frame.

44. The shuttle valve of claim 43, wherein said frame comprises:
(a) an end plate; and
(b) a plurality of elongated frame members extending between said first sub and said end plate.

45. The shuttle valve of claim 35, wherein said shuttle valve comprises a bi-directional annular packing and first and second uni-directional packings mounted in said bore, wherein
(a) said first uni-directional packing is positioned axially between said fluid inlet and said first fitting body conduit;
(b) said bi-directional packing is positioned axially between said first and second fitting body conduits, and
(c) said second uni-directional packing is positioned axially between said second fitting body conduit and said bore opening.

46. The shuttle valve of claim 35, wherein said fitting body has a flange union face at each of said fluid inlet and said first and second fluid outlets, said flange union faces adapted to allow a flowline component to be joined to said shuttle valve at said inlet and said outlets by a flange union.

47. The shuttle valve of claim 35, wherein said fitting is rated for high pressure service.

48. A zipper manifold comprising the shuttle valve of claim 35.

49. A system for fracturing a well comprising the zipper manifold valve of claim 48.

50. A method of servicing a plurality of wells, said method comprising:
(a) providing a fitting of claim 35;
(b) setting said plunger in its first said position to establish said first path through said fitting body;
(c) flowing a well treatment fluid to or from a first said well through said fitting along said first path;
(d) setting said plunger in its second said position to establish said second path through said fitting body; and
(e) flowing said well treatment fluid to or from a second said well through said fitting along said second path.

* * * * *

UNITED STATES PATENT AND TRADEMARK OFFICE
CERTIFICATE OF CORRECTION

PATENT NO. : 11,193,349 B1  
APPLICATION NO. : 16/892777  
DATED : December 7, 2021  
INVENTOR(S) : Mark C. Dille et al.

Page 1 of 1

It is certified that error appears in the above-identified patent and that said Letters Patent is hereby corrected as shown below:

In the Claims

In Claim 32, at Column 27, Line 56, before "first path" insert -- said --.

In Claim 35, at Column 28, Lines 7-8, delete "said fitting" and insert therein -- said shuttle valve --.

In Claim 40, at Column 28, Line 52, delete "linear" and insert therein -- linearly --.

In Claim 45, at Column 29, Line 13, delete "(b) said bi-directional" and insert therein -- (b) said first bi-directional --.

In Claim 47, at Column 30, Line 3, delete "said fitting" and insert therein -- said shuttle valve --.

In Claim 50, at Column 30, Line 11, delete "a fitting" and insert therein -- a shuttle valve --.

In Claim 50, at Column 30, Line 15, delete "said fitting" and insert therein -- said shuttle valve --.

In Claim 50, at Column 30, Line 20, delete "said fitting" and insert therein -- said shuttle valve --.

Signed and Sealed this  
Eighth Day of March, 2022

Drew Hirshfeld  
*Performing the Functions and Duties of the*  
*Under Secretary of Commerce for Intellectual Property and*  
*Director of the United States Patent and Trademark Office*